(12) United States Patent
Conlon et al.

(10) Patent No.: US 8,021,256 B2
(45) Date of Patent: Sep. 20, 2011

(54) ELECTRICALLY-VARIABLE TRANSMISSION WITH COMPOUNDED OUTPUT GEARING

(75) Inventors: Brendan M. Conlon, Rochester Hills, MI (US); Klaus Kersting, Birmingham, MI (US); Andrew W. Phillips, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 360 days.

(21) Appl. No.: 12/244,836

(22) Filed: Oct. 3, 2008

(65) Prior Publication Data
US 2009/0111635 A1    Apr. 30, 2009

Related U.S. Application Data

(60) Provisional application No. 60/984,203, filed on Oct. 31, 2007.

(51) Int. Cl.
*F16H 3/72* (2006.01)
(52) U.S. Cl. .......................................................... 475/5
(58) Field of Classification Search ........... 475/5; 477/3
See application file for complete search history.

(56) References Cited

U.S. PATENT DOCUMENTS

| | | | | |
|---|---|---|---|---|
| 5,935,035 A * | 8/1999 | Schmidt | | 475/5 |
| 6,962,545 B2 * | 11/2005 | Larkin | | 475/5 |
| 7,285,066 B2 * | 10/2007 | Long et al. | | 475/121 |
| 7,288,039 B2 * | 10/2007 | Foster et al. | | 475/5 |
| 7,396,306 B2 * | 7/2008 | Long et al. | | 475/127 |
| 7,645,206 B2 * | 1/2010 | Holmes et al. | | 475/5 |
| 7,695,387 B2 * | 4/2010 | Oba | | 475/5 |
| 7,699,735 B2 * | 4/2010 | Conlon | | 475/5 |
| 2009/0275438 A1 * | 11/2009 | Kersting | | 475/5 |
| 2009/0281694 A1 * | 11/2009 | Conlon et al. | | 701/51 |

* cited by examiner

*Primary Examiner* — Dirk Wright
(74) *Attorney, Agent, or Firm* — Quinn Law Group, PLLC

(57) ABSTRACT

An electrically-variable transmission is provided with first and second motor/generators and three planetary gear assemblies. At least one of the planetary gear assemblies is a planetary gear assembly having multiple planetary gear sets. As a result, the gears for the planetary gear assembly can be represented on multiple radial planes. Each of the planetary gear assemblies has continuous interconnections, and selective connections via a plurality of torque-transmitting mechanisms, that provide three forward electrically-variable modes. Preferably, the planetary gear assemblies are connected to one another in such a manner as to allow shifting between one of the electrically-variable modes to occur at a point offset from a mechanical power flow of the transmission. This decreases the maximum power output required from the motor/generators.

10 Claims, 12 Drawing Sheets

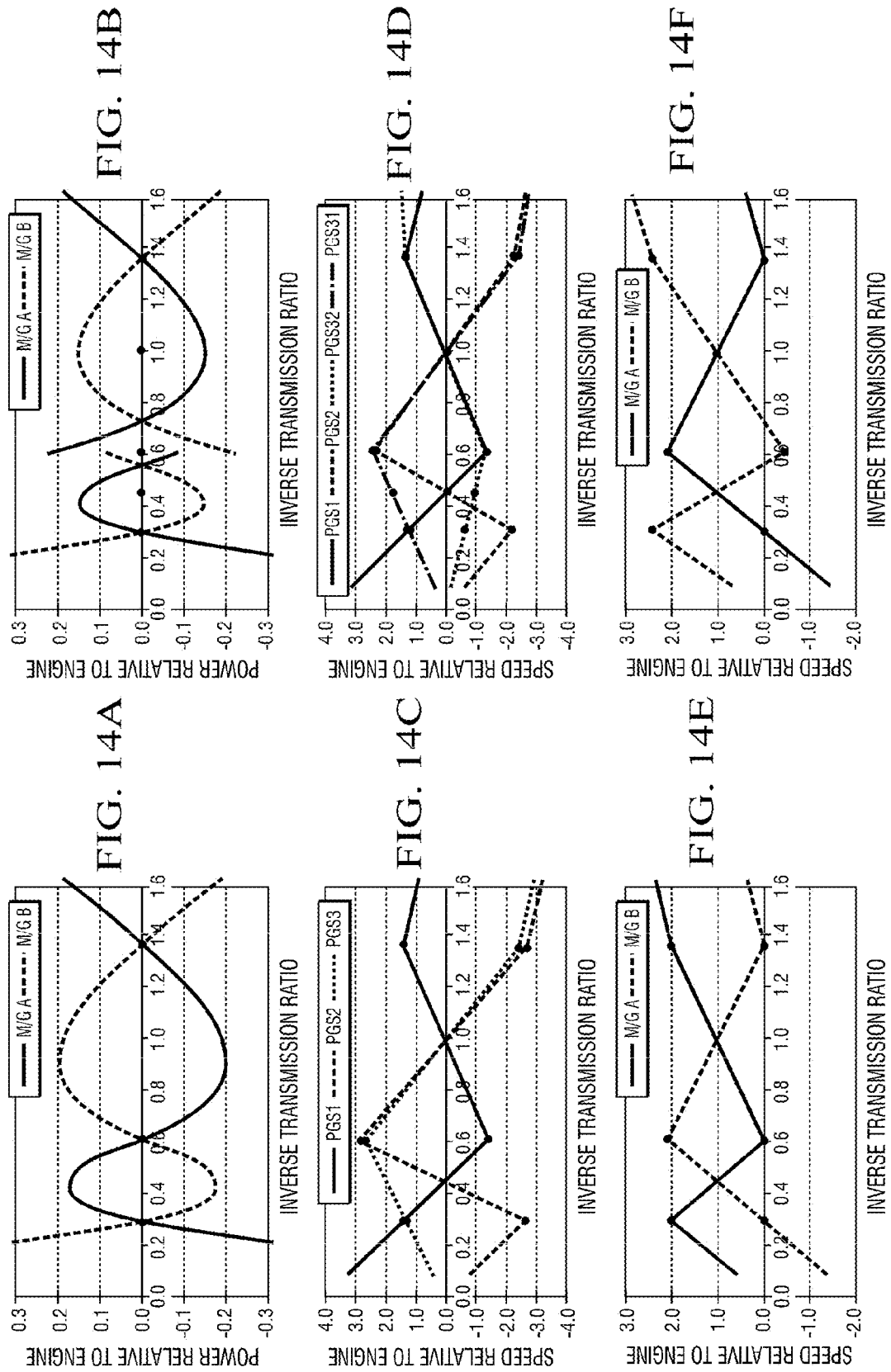

ELECTRICALLY-VARIABLE TRANSMISSION WITH COMPOUNDED OUTPUT GEARING

CROSS REFERENCE TO RELATED APPLICATION

This application claims the benefit of U.S. Provisional Patent Application No. 60/984,203, filed Oct. 31, 2007, and which is hereby incorporated by reference in its entirety.

TECHNICAL FIELD

The invention relates to an electrically-variable transmission with three forward electrically-variable modes having at least one planetary gear assembly with multiple planetary gear sets to create a shift ratio that occurs independently from a set of mechanical points.

BACKGROUND OF THE INVENTION

Electrically-variable transmissions typically have an input member connected to an engine and one or two motor/generators connected to different members of planetary gear assemblies to allow one or more electrically-variable modes of operation, fixed speed ratio modes, and an electric-only (battery powered) mode. Electrically-variable transmissions may improve vehicle fuel economy in a variety of ways.

For instance, the motor generators are able to capture vehicle kinetic energy during braking, which is used by one of the motors acting as a generator to allow the engine to be turned off at idle, during periods of deceleration and braking, and during periods of low speed or light load operation to eliminate efficiency losses due to engine drag. Transient demand for engine torque or power is supplemented by the motor/generators during operation in engine-on, electrically-variable modes. The motor/generators keep the engine off longer, supplement engine torque or power and/or operate at a lower engine speed, or supplement accessory power supplies. Additionally, the motor/generators are very efficient in accessory power generation and electric power from the battery serves as an available torque reserve allowing operation at a relatively low transmission numerical speed ratio.

To extend the electrically variable modes of operation the motor/generator sizes are typically increased to provide additional power and speed to the transmission at peak demands.

SUMMARY OF THE INVENTION

An electrically-variable transmission is provided with two electric motor/generators and a plurality of planetary gear assemblies. At least one of the planetary gear assemblies includes multiple planetary gear assemblies. The transmission provides three forward electrically-variable modes by engagement of torque-transmitting mechanisms in different combinations.

The first, second, and third planetary gear assemblies of the transmission may each be represented by a different lever in a lever diagram of the transmission. For the simple planetary gear assemblies each lever has a first, a second and a third node representing a respective different member of the planetary gear assembly represented by the lever. The planetary gear assembly having multiple planetary gear sets is represented by a four node lever, with each node representing a different member of the planetary gear assembly. An input member, an output member and the first and second motor/generators are each connected with a different one of the nodes. Torque-transmitting mechanisms are selectively engagable in different combinations to connect the nodes with one another or with a stationary member to establish three forward electrically-variable modes.

In one embodiment, an interconnecting member is continuously connected with a member of the first planetary gear assembly, a member of the second planetary gear assembly, and one of the members of the third planetary gear assembly. One member of the third planetary gear assembly is connected to an output of the transmission. Another of the members of the third planetary gear assembly is connected for common rotation with either the stationary member or one of the motor/generators in each of the three forward electrically-variable modes. Finally, one member is selectively connected to the stationary member. The member of the third planetary gear assembly selectively connected to the stationary member allows the transmission to shift when the one of the motor/generators is rotating. This increases the ratio coverage of the transmission modes by separating the mechanical points, or ratios, at which the transmission operates in a purely mechanical mode. Also, the maximum required torque output of the first and the second motor/generators is reduced. Therefore, the required power output of the motor/generators decreases.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 14A-F are a plurality of graphs comparing the characteristics of the transmission of FIG. 1 with nodes G and J separated versus a transmission in which nodes G and J are coincident.

DESCRIPTION OF THE PREFERRED EMBODIMENTS

First Lever Diagram Embodiment

Figures 1, 2:
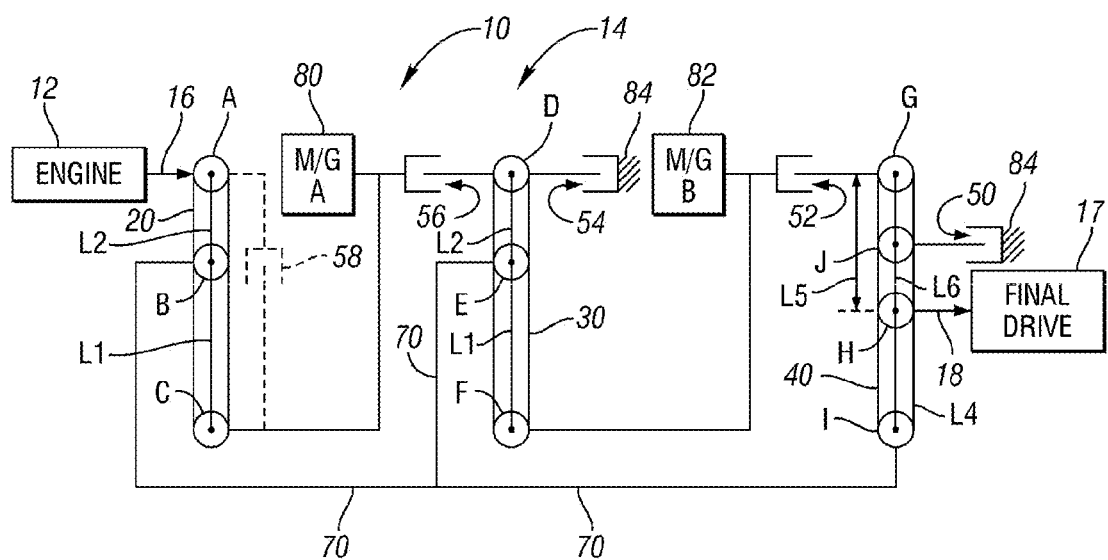
FIG. 1 is a schematic illustration of a first embodiment of an electrically-variable transmission depicted in lever diagram form.
FIG. 2 is a schematic illustration of the embodiment of FIG. 1 in a first forward electrically-variable mode.

Referring to the drawings, wherein like reference numbers refer to like components, FIG. 1 illustrates a powertrain 10 including an engine 12 connected to an electrically-variable transmission 14. The transmission 14 is designed to receive at least a portion of its driving power from the engine 12 in some of its operating modes, as discussed below. The engine has an output shaft that serves as an input member 16 of the transmission 14. A final drive unit 17 is operatively connected to an output member 18 of the transmission 14.

The transmission 14 includes a three-node lever 20 representing a first planetary gear assembly having a first, a second and a third member, represented by nodes A, B and C, respectively. The members may be a ring gear member, a sun gear member and a carrier member, although not necessarily in that order. As used herein, a "node" is a component of a transmission, such as a ring gear member, a carrier member, or a sun gear member, which is characterized by a rotational speed and which can act as a junction of torques applied to that component from other components and by that component to other components. The other components which may interact with a given node include other coaxial members of the same set of planetary gears which appear as other nodes on the same lever. The other components which may interact with a given node also include interconnections to members of other planetary gear assemblies which appear as nodes on another lever, a stationary member such as the transmission case, and other transmission members.

The transmission 14 includes another three-node lever 30 representing a second planetary gear assembly having a first, a second and a third member, represented by nodes D, E, F, respectively. The nodes D, E, and F each represent a ring gear member, a sun gear member, and a carrier member, although not necessarily in that order.

The transmission 14 further includes a third planetary gear assembly which is a planetary gear assembly having multiple planetary gear sets. As a result, the gears for the planetary gear assembly can represented on multiple radial planes, which is represented by a four-node lever 40 having first, second, third and fourth nodes G, H, I and J respectively. The nodes G, H, I and J each represent a sun gear member, a ring gear member, a carrier member and at least one additional sun gear member, ring gear member or carrier member, although not necessarily in that order. As described, the planetary gear assembly represented by the four-node lever is located as the output planetary gear assembly, but may be positioned in other locations as well.

Figure 5:
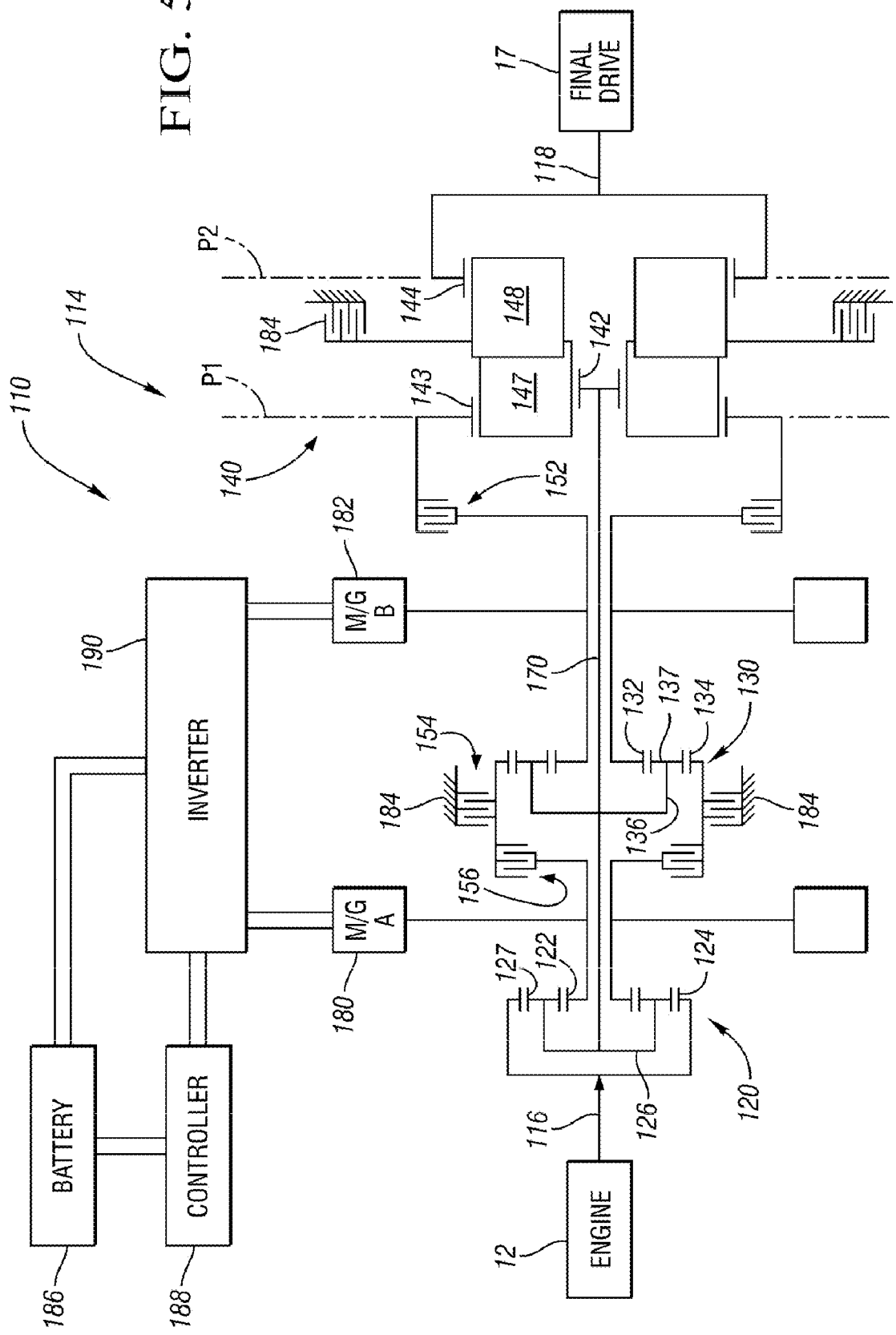
FIG. 5 is a schematic illustration of an embodiment of the transmission of FIG. 1 in stick-diagram form.
Figure 6:
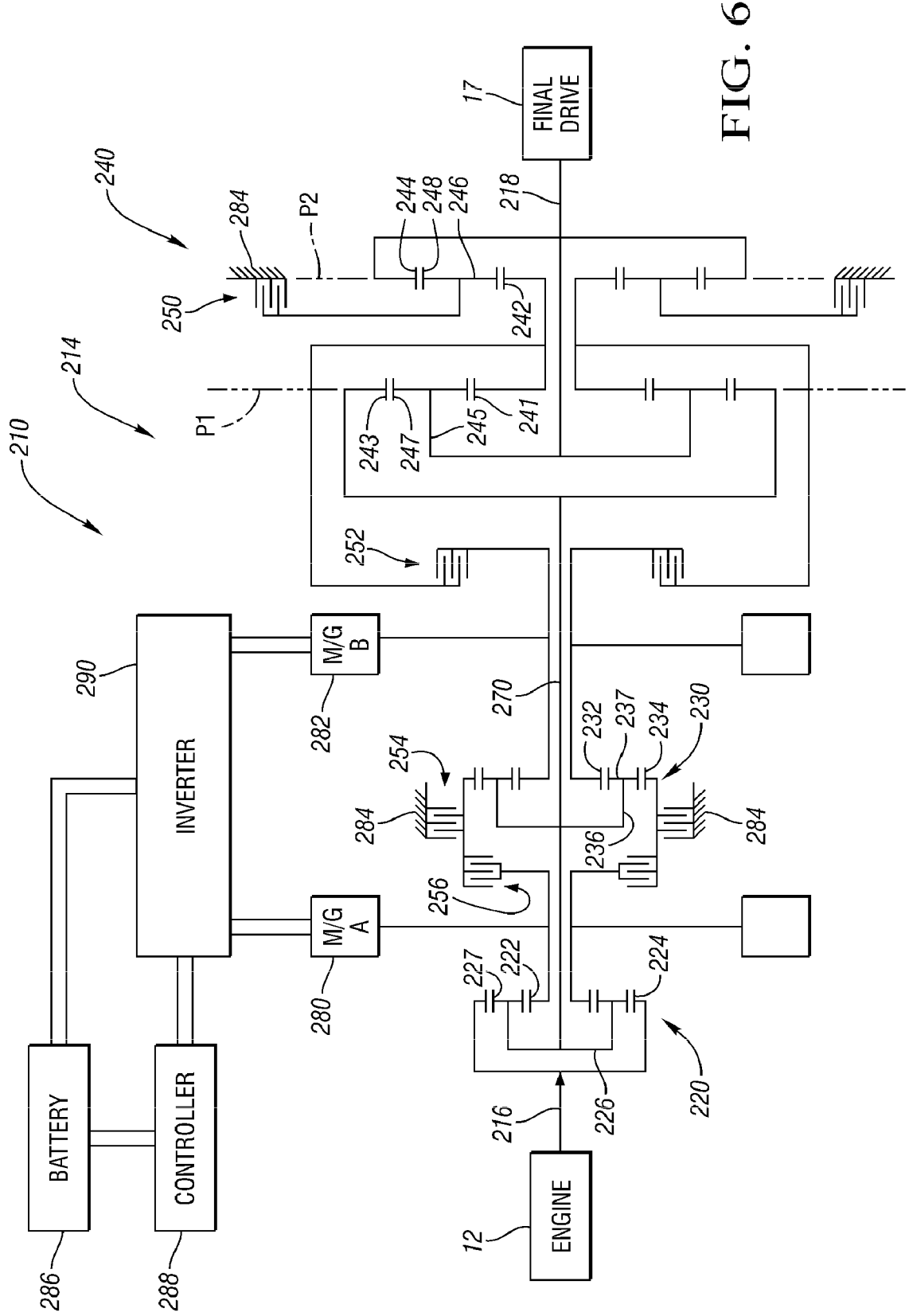
FIG. 6 is a schematic illustration of another embodiment of the transmission of FIG. 1 in stick-diagram form.
Figure 7:
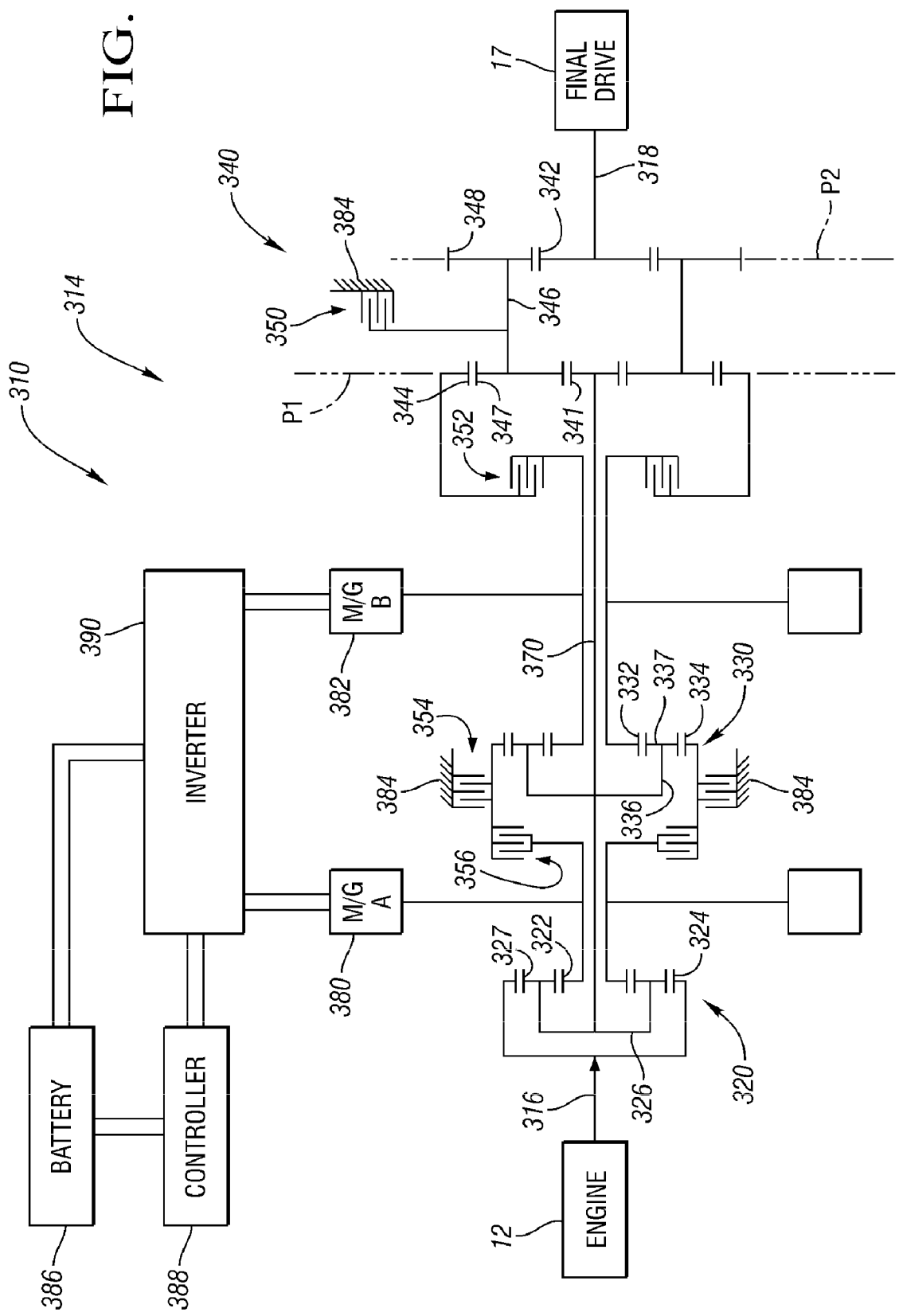
FIG. 7 is a schematic illustration of another embodiment of the transmission of FIG. 1 in stick-diagram form.

Multiple planetary gear members may be represented by a single node as is known in the art. One skilled in the use of lever analysis would readily understand which type of planetary gear member to assign at each node. In any event, a planetary gear assembly representable by a four node lever establishes two distinct radial gear planes P1 and P2, as illustrated in FIGS. 5-7, and understood by those skilled in the art. A "gear plane" is a radial plane in the transmission in which different radially aligned gear members intermesh. It is differentiated from other radial gear planes in the transmission that have at least one different gear member among it and another set of radially aligned intermeshing gears.

The transmission 14 has several fixed interconnections. An interconnecting member 70 continuously interconnects nodes B, E and I for common rotation. The interconnecting member 70 may be a single component, such as a main shaft running axially in the transmission 14 or, separate components may be used, for example to connect nodes B and E, and nodes E and I, respectively. A motor/generator 80 (also referred to as M/G A) is continuously connected with node C. The input member 16 is connected for common rotation with node A. Another motor/generator 82 (also referred to as M/G B) is connected for common rotation with node F. Node H is connected for common rotation with the output member 18. As will be understood by those skilled in the art, the motor/generators 80, 82 each have a rotor that is rotatable and a stator that is continuously grounded to a stationary member, such as a casing of the transmission 14. The transmission 14 is configured such the motor/generators 80 and 82 are subjected to a substantially equal maximum power requirement that is required of each respective motor/generator at some point during three forward electrically-variable modes. This allows the motor/generators to have a substantially equal, minimal size.

The transmission 14 also has several selectively engagable torque-transmitting mechanisms that provide various operating modes, as described below. Torque-transmitting mechanism 50, a stationary clutch, also referred to as a brake, is selectively engagable to ground node J with a stationary member 84, such as a casing of the transmission 14. Torque-transmitting mechanism 52, a rotating clutch, is selectively engagable to connect node F and motor/generator 82 for common rotation with node G. Another torque-transmitting mechanism 54, a stationary clutch, is selectively engagable to ground node D to the stationary member 84. Torque-transmitting mechanism 56, a rotating clutch, is selectively engagable to connect node C and motor/generator 80 for common rotation with node D.

An additional, optional torque-transmitting mechanism 58 (shown in phantom in FIG. 1 to denote that it is optional) may be included to provide additional operating modes, as described below. Torque-transmitting mechanism 58, a rotating clutch, is selectively engagable to connect node A for common rotation with node C. By connecting the two members of the planetary gear assembly represented by the nodes A and C of lever 20, engagement of torque-transmitting mechanism 58 causes all members of the planetary gear assembly represented by lever 20 to rotate at the same speed, thus functioning as a lock-up clutch.

If the torque-transmitting mechanism 50 is engaged, node J is a reaction member within the planetary gear assembly represented by lever 40, and power transferred via the interconnecting member 70 will be transmitted through nodes I and G to node H and therefore to the output member 18. When the torque-transmitting mechanism 52 is engaged, the motor/generator 82 receives power from or delivers power to node G as well as node F. When the torque-transmitting mechanism 54 is engaged, node D is held stationary and becomes a reaction member within the planetary gear assembly represented by lever 30. When the torque-transmitting mechanism 56 is engaged, the motor/generator 80 is connected for rotation with node D, and either receives or accepts power through node D as well as node C. When torque-transmitting mechanism 58 is engaged, the planetary gear assembly represented by lever 20 is locked-up, such that the speed of the input member is supplied to node E.

Each embodiment of a powertrain and transmission discussed herein has an electric power source that is operatively connected to the motor/generators such that the motor/generators may transfer power to or receive power from the power source. A controller is operatively connected to the electric power source to control the distribution of power from or to the power source. An electric power source may be one or more batteries. Other electric power sources, such as fuel cells, have the ability to provide, or store and dispense, electric power and may be used in place of batteries. An electric power source and controller is shown and described with respect to each of the embodiments of FIGS. 5-7, which are shown in stick-diagram form. The embodiments of FIGS. 1-4, which are shown in lever diagram form, also incorporate an electric power source and controller, although not shown, which are operatively connected to the motor/generators in like manner as shown in FIGS. 5-7. Operating data gathered by sensors, such as the speed of the input member 16 and of the output member 18, may be provided to the controller as well, for various uses, such as when operating in a regenerative braking mode.

The transmission 14 achieves several operating modes, including three forward electrically-variable modes, each illustrated in FIGS. 2-4, respectively, as further detailed below. The transmission embodiments of FIGS. 5-7 are various specific implementations of the lever diagram transmission 14, and operate in like manner as the transmission 14. Engagement of the torque-transmitting mechanisms 50, 52, 54 and 56 in combinations of two establishes the three forward electrically-variable modes of operation. The engagement of torque-transmitting mechanisms 50 and 54 establishes a first forward electrically-variable mode. The engagement of torque-transmitting mechanisms 50 and 56 establishes a second forward electrically-variable mode. The engagement of torque-transmitting mechanisms 52 and 56 establishes a third forward electrically-variable mode. Engagement of the torque-transmitting mechanisms 50, 52, 54 and 56 in combinations of three establishes various fixed ratio operating modes. Engagement of torque-transmitting mechanism 58 in addition to each set of torque-transmitting mechanisms that establish the respective electrically-variable modes permits a fixed ratio mode for those electrically-variable modes wherein the connected motor/generator 80 turns in the forward direction relative to the engine 12. The transmission 14 is capable of driving the output member 18 without action of the engine 12, that is while input member 16 is stationary, in any of the electrically-variable modes but would preferably operate in the first forward electrically-variable mode. The transmission 14 is also capable of driving the output member 18 in reverse in any of the electrically-variable modes but would preferably operate in the first forward electrically-variable mode for reverse operation as well, simply by choosing a combination of speeds of the motor/generators 80 and 82 to cause reverse rotation of the output member 18.

Those skilled in the art of transmission design will recognize that the dimensions of the segments of a lever (i.e., the relative spacing between nodes) are proportionate to, and representative of, the number of gear teeth on, or the working radii of, the gear members that determine the effective gear ratio of the planetary gear assembly represented by the lever. As used herein, an "effective gear ratio", in the case of a simple planetary gear assembly, is:

$N_R/N_S$, the ratio of the number of teeth of the ring gear member $N_R$ to the number of teeth of the sun gear member $N_S$.

For a simple planetary gear assembly, this ratio is generally known simply as the "gear ratio", but a broader term must be included herein to define the relative sizes of the members of a planetary gear assembly having multiple planetary gear sets. In this instance, the effective gear ratio depends upon the ratio of the component that acts as a ring gear member would in a simple planetary gear assembly to the component that acts as a sun gear member would in a simple planetary gear assembly. As is shown below the components acting as the input and output of the planetary gear assembly may change during each mode of operation.

In terms of lever analysis and referring to the transmission 14 of FIG. 1, the distance between nodes A and B is L2 while the distance between nodes B and C is L1. The distance L1 is chosen to be substantially equal to twice the distance L2, creating an effective gear ratio of lever 20 of 2.0. The distance between nodes E and F is equivalent to that between nodes B and C, or L1. The distance between nodes D and E is equivalent to that between nodes A and B, or L2. Thus, the effective gear ratio of lever 30 is 2.0.

The distance between nodes H and I is L4, and is chosen to be equal to the average of distance L5, between nodes G and H, and distance L6, between nodes J and H. In other words L4=(L5+L6)/2. The effective gear ratio of lever 40 would then be as close as is practical to 1.0.

The leverage that a node has about another node is proportionate to the distance to the other node; thus, node C has twice the leverage about node B as does node A; node F has twice the leverage about node E as does node D. The leverage of node I is equal to the average leverage of nodes G and J have about node H. Additionally, the torque relationship between members of a planetary gear assembly may be represented and replaced by proportionate horizontal forces acting on the respective nodes. Because the torques acting on a planetary gear assembly must balance, the forces acting on the lever must likewise be balanced. The relative placement of nodes on a lever are points of application of forces analogous to ring gear member, sun gear member and carrier member torques.

The three forward electrically-variable modes of operation are described below. There are, of course, other combinations of engagements of the torque-transmitting mechanisms that will permit other operating conditions. For example, with the torque-transmitting mechanisms 54 and 56 engaged simultaneously, the motor/generator 80 can be utilized as a motor to supply power to the interconnecting member 70 and thereby provide starting torque for the engine 12. If all four of the torque-transmitting mechanisms 50, 52, 54 and 56 are engaged simultaneously, the input shaft 16 and the output shaft 18 are effectively grounded and therefore no power can be transmitted, thus producing a "park gear" arrangement. The simultaneous disengagement of all of the torque-transmitting mechanisms provides a positive neutral condition.

For purposes of the following discussion, the rotational direction of the engine 12 will be considered forward or positive, and the rotational direction opposite that of the engine 12 will be considered reverse or negative.

During the first mode of operation, the torque-transmitting mechanisms 50 and 54 are engaged. In a neutral condition, the engine 12 is at an idle speed, and the speed of the motor/generator 80 is negative or reverse, such that the speed of the node B is zero. When the powertrain 10 is being operated in the neutral condition, it can move a vehicle in either a forward direction or a reverse direction. For movement in the reverse direction, the negative or reverse speed of the motor/generator 80 is permitted to increase, thereby increasing the speed of node B in the negative direction. The motor/generator 82 is operated as a motor to assist in driving the vehicle and therefore adding power to the transmission 14 at the node F, which is distributed to the interconnecting member by the node E. This power is transmitted to node I and then through node G to node H and thus, to the output member 18. As is noted, the vehicle can be moved in the reverse direction from the neutral condition. Also, during the reverse operation, the speed of the engine 12 is increased from the idle speed to an elevated speed.

First Forward Electrically-Variable Mode of Operation

To establish the first forward electrically-variable mode, the torque-transmitting mechanisms 50 and 54 are engaged, the engine 12 is accelerated from the idle speed to a desired speed, and then the speed of the motor/generator 80 (operating as a generator) is decreased, and the speed of the motor/generator 82 (operating as a motor) is increased. This operation will continue until the speed of motor/generator 80 is zero. At the point when the speed of motor/generator 80 reaches zero the speed of motor/generator 82 is at a maximum. However, both the motor/generator 80 and the motor/generator 82 have zero power output. This is the end of the first forward electrically-variable mode of operation.

Referring to FIG. 2, the interconnections established in the transmission 14 during the first forward electrically-variable mode, via engagement of torque-transmitting mechanisms 50 and 54 are illustrated. The torque required at node C provided by motor/generator 80 is inversely proportional to the distance between nodes C and B (L1) relative to the distance between nodes A and B (L2), which denote the leverage of the motor/generator 80 and input member 16, respectively, about node B (which is the output member of the lever 20). The length of L1 is double the length of L2, so the torque required from the motor/generator 80 connected to node C is half of the torque provided at the input member 16 connected to node A.

At the end of the first forward electrically-variable mode of operation, with the speed of motor/generator 80 at zero, the node D is stationary, as held by the torque-transmitting mechanism 54, and the speed of the motor/generator 82 is at the maximum. At this point, the torque-transmitting mechanisms 54 and 56 can be interchanged in a synchronous condition, such that there is no slippage involved in either the engagement or disengagement of these devices.

Second Forward Electrically-Variable Mode of Operation

The second electrically-variable mode of operation begins by disengaging torque-transmitting mechanism 54 and engaging torque-transmitting mechanism 56, with the operation of the motor/generator 82 thereby being changed from operating as a motor to operating as a generator. Also at this interchange point, the operation of motor/generator 80 changes from a generator mode to a motor mode. The speed of the engine 12 can be held at a desired speed throughout the second electrically-variable mode, or it can be varied as desired.

Figure 3:
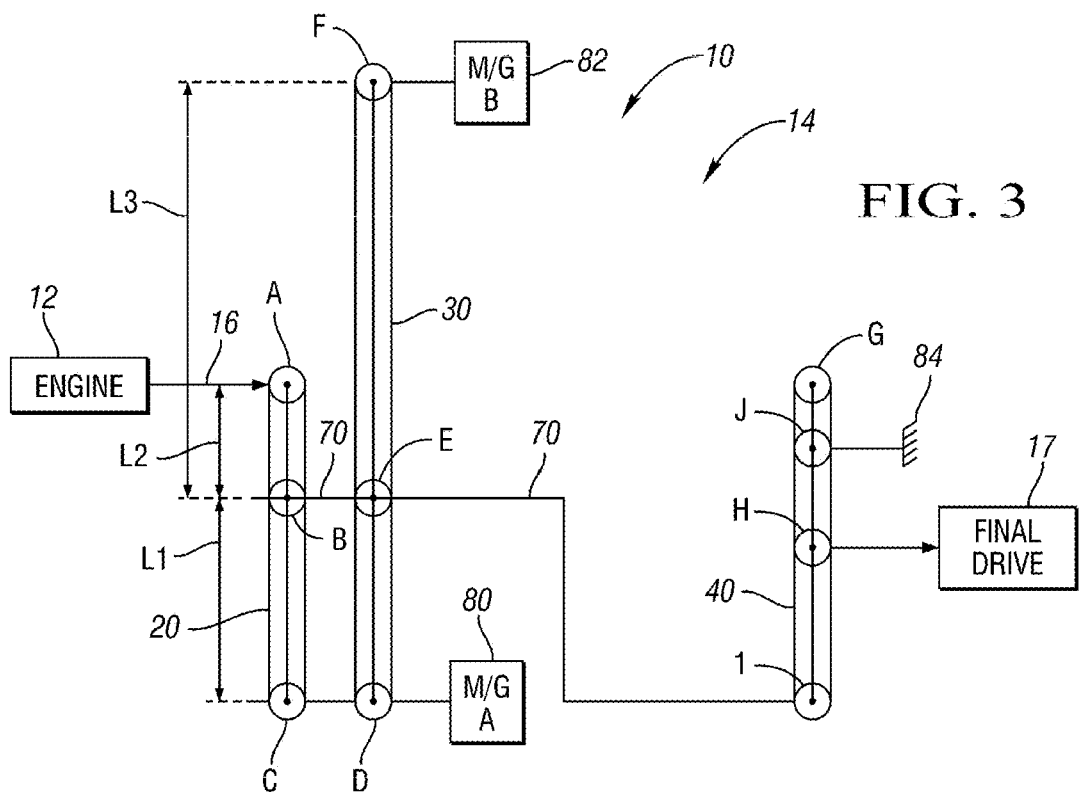
FIG. 3 is a schematic illustration of the embodiment of FIG. 1 in a second forward electrically-variable mode.

Referring to FIG. 3, the lever diagram resulting from the interconnections established in the transmission 14 during the second forward electrically-variable mode, via engagement of torque-transmitting mechanisms 50 and 56 is illustrated. Specifically, node J is grounded to stationary member 84, and motor/generator 80 and node C are connected for common rotation with node D. When two nodes of a three-node lever are connected with two other nodes of another three-node lever, the levers are collapsed together, with the connected nodes aligned, and the levers resealed as necessary in order to align the connected nodes, as is known to those skilled in the art.

In the second electrically-variable mode, because nodes C and D are connected, as well as nodes B and E, the levers 20 and 30 are collapsed with the nodes B and E aligned, and the nodes C and D aligned. The distance between nodes D and E lengthens from L2 to L1, causing the distance between nodes F and E to likewise double, from L1 to L3, which is twice the length of L1. Thus, the torque required at nodes C and D provided by motor/generator 80 is half the torque provided at the input member 16 by engine 12, when motor/generator 82 is not providing torque, as represented by the distance between nodes C and D (L1) relative to the distance between nodes A and B (L2). The torque required at node F by motor/generator 82 is one-fourth of that provided at the input member 16, when motor/generator 80 is not providing torque, as represented by the distance between nodes F and E (L3) and the distance between nodes A and E (L2).

At the beginning of the second electrically-variable mode, the motor/generator 80 is stationary and is providing all the torque then necessary to react to the torque provided by input member 16. At end of the second electrically-variable mode, the motor/generator 82 is supplying all the torque necessary for reaction to the torque provided to the input member 16. Between these two points, the motor/generators 80 and 82 share the task of providing reaction torque, such that this load can be transferred gradually from motor/generator 80 to motor/generator 82 through the second electrically-variable mode. The maximum power of motor/generator 80 and motor generator 82 are reached during the second electrically-variable mode. Due to the additional node, represented by node J, the maximum required power of motor/generators 80 and 82 are reduced compared with a planetary gear assembly represented by a three-node lever.

To continue to accelerate the output member 18 (and a vehicle on which the transmission 14 is installed) during the second electrically-variable mode of operation, the speed of the motor/generator 80 (operating as a motor) is increased from zero in the forward direction and the speed of the motor/generator 82 (operating as a generator) is decreased. Both the motor/generator 80 and the engine 12 impart positive or forward rotation to the node B, and the motor/generator 82 provides a rotating reaction member at node F of the lever 30. The electrical energy generated by the motor/generator 82 can be utilized to either recharge a battery connected to the motor/generators 80, 82, provide electrical power to drive the motor/generator 80, or to do both depending upon the amount of power needed at the motor/generator 80 and the level of charge of the battery.

The powertrain 10 continues to operate in the second electrically-variable mode until the speed of the motor/generator 82 has decreased to match the speed of the gear represented by node G. When the speed of motor/generator 82 is equal to the speed of the node G the torque-transmitting mechanism 52 can be engaged to connect the motor/generator 82 to the node G. Therefore, the torque-transmitting mechanisms 50 and 52 can be interchanged at this point in a synchronous manner, wherein no slippage occurs during the ratio interchange. Node J is no longer held stationary by torque-transmitting mechanism 50.

An output planetary gear assembly that is representable by a three-node lever, would place the transmission 14 at a mechanical point for this shift point. That is, without node J to be held stationary by torque-transmitting mechanism 50 node G would be held stationary during the first electrically-variable mode of operation. The shift point between the first forward electrically-variable mode and the second forward electrically variable mode would then occur when the speed of motor/generator 82 is zero. A mechanical point occurs when the transmission 14 is operating in a substantially mechanical power flow arrangement. That is, the power flow through the electrical path is zero because one the motor/generators has zero speed.

However, the transmission 14 has a planetary gear assembly represented by a four-node lever that offsets the shift point (i.e. the point where motor/generator 82 matches the speed of node G) from the mechanical point (i.e. the point where motor/generator 82 has zero speed).

This is the end of the second forward electrically-variable mode of operation and the beginning of the third forward electrically-variable mode of operation.

Third Forward Electrically-Variable Mode of Operation

During the third forward electrically-variable mode of operation, the motor/generator 80 is operated as a generator and the motor/generator 82 is operated as a motor. The speed of motor/generator 80 decreases while the speed of the motor/generator 82 increases. Nodes G and H are both driven in a forward or positive direction. Node G is driven by the motor/generator 82, and node I is driven by both the engine 12 through the planetary gear assembly represented by lever 20 and the motor/generator 82 through the planetary gear assembly represented by lever 30.

Figure 4:
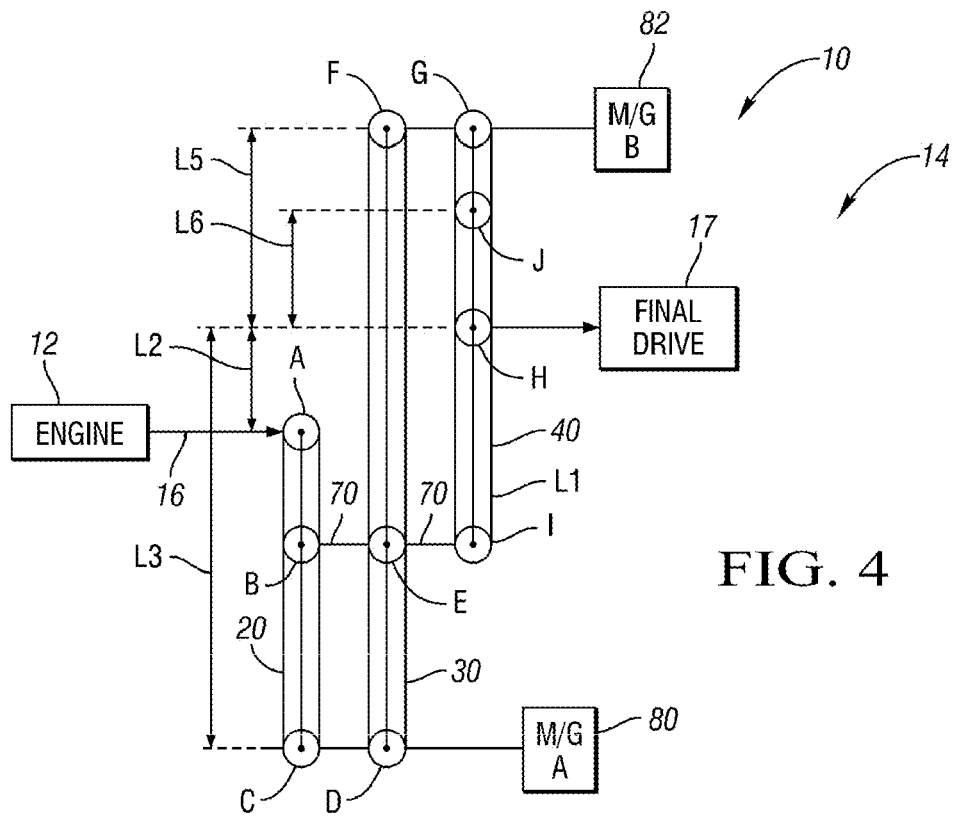
FIG. 4 is a schematic illustration of the embodiment of FIG. 1 in a third forward electrically-variable mode.

Referring to FIG. 4, the lever diagram resulting from the interconnections established in the transmission 14 during the third forward electrically-variable mode, via engagement of torque-transmitting mechanisms 52 and 56 is illustrated. Specifically, motor/generator 82 and node F are connected for common rotation with node G, and motor/generator 80 and node C are connected for common rotation with node D. Because two nodes of lever 20 are connected with two nodes of lever 30 and two nodes of lever 30 are connected with two nodes of lever 40, the levers 20, 30 and 40 are collapsed together, with the connected nodes aligned, and the levers 20, 30 and 40 are rescaled as necessary in order to align the connected nodes. Thus, in the third electrically-variable mode, because nodes C and D are connected, nodes B, E and I are connected, as well as nodes F and G, the levers 20, 30 and 40 are collapsed with these respective nodes aligned.

The distance between nodes H and I increases from L4 to L1 and the average of the distance between nodes H and J and nodes H and G increases from L4 to L1 as well. The torque required at nodes C and D provided by motor/generator 80 is one-fourth the torque provided at the input member 16 by engine 12, when motor/generator 82 is not providing torque, as represented by the relative distances L3 and L2. The torque required at node F by motor/generator 82 is half that provided at the input member 16, when motor/generator 80 is not providing torque, as represented by the relative distances L1 and L2, respectively.

During the third forward electrically-variable mode of operation, the motor/generator 82 supplies electrical power to the transmission 14 which can be utilized to power the motor/generator 82 and/or provide energy to a battery connected thereto to increase the battery storage charge. The third forward electrically-variable mode of operation can continue until the powertrain 10 powers a vehicle to its maximum speed point, at which the speed of motor/generator 80 is zero. The maximum power of motor/generator 80 and motor generator 82 are reached again at the third electrically-variable mode. As before, due to the additional node, represented by node J, the maximum required power of motor/generators 80 and 82 are reduced compared with a planetary gear assembly represented by a three-node lever.

Fixed Ratio Modes

The transmission 14 also provides three fixed ratio modes of operation. A first fixed ratio mode is provided by engaging torque-transmitting mechanisms 50, 54 and 56, preferably at the first shift point established between the first and second forward electrically-variable modes, when the speed of motor/generator 80 is zero. A second fixed ratio mode is established by engaging torque-transmitting mechanisms 50, 52 and 56, preferably at the second shift point established between the second and third electrically-variable modes, when the speed of motor/generator 82 is zero. A third fixed ratio mode is established by engaging torque-transmitting mechanisms 52, 54 and 56, preferably at a third shift point when the speed of motor/generator 80 is zero.

A powertrain 110, shown in FIG. 5, provides a specific embodiment of a transmission 114 representable by and operable in the same manner as the powertrain 10 shown in lever diagram form in FIGS. 1-4. Powertrain 110 includes the engine 12, the final drive mechanism 17, and an electrically-variable transmission 114 with an input member 116 connected for rotation with the engine 12 and an output member 118 connected for rotation with the final drive mechanism 17. The transmission 114 includes three planetary gear assemblies 120, 130, and 140, represented in FIGS. 1-4 as levers 20, 30 and 40, respectively. Each of the planetary gear assemblies are each composed of one or more planetary gear assemblies connecting in such a way to be represented by a three or four node lever.

The planetary gear assembly 120 includes a sun gear member 122, a ring gear member 124, and a carrier member 126. The carrier member 126 rotatably supports a plurality of pinion gears 127 that are disposed in meshing relationship with both the sun gear member 122 and the ring gear member 124. The ring gear member 124 has 86 teeth and the sun gear member 122 has 44 teeth, establishing an effective gear ratio of 1.954 for the planetary gear assembly 120.

The planetary gear assembly 130 includes a sun gear member 132, a ring gear member 134, and a carrier member 136 that rotatably supports a plurality of pinion gears 137 that are disposed in meshing relationship with both the sun gear member 132 and the ring gear member 134. The ring gear member 134 has 86 teeth and the sun gear member 132 has 44 teeth, establishing an effective gear ratio of 1.954 for the planetary gear assembly 130.

The planetary gear assembly 140 is a Ravigneaux gear set. A Ravigneaux gear set consists of two simple planetary gear assemblies with a common ring gear. The internal gears are different diameters and mounted to the same planet carrier. The planetary gear assembly 140 includes a sun gear member 142, a first ring gear member 143, a second ring gear member 144, and a carrier member 146. The carrier member 146 rotatably supports a first set of pinion gears 147 as well as a second set of pinion gears 148. The first set of pinion gears 147 are disposed in meshing relationship with the sun gear member 141 and the first ring gear 143 and the second set of pinion gears 148 are disposed in meshing relationship with the second ring gear 144 and rotate about the same axes as the first set of pinion gears 147.

An interconnecting member 170 continuously connects the carrier member 126, the carrier member 136, and the sun gear member 142. The interconnecting member 170 may alternatively be two separate components, one connecting the carrier members 126 and 136, and another connecting carrier member 136 with sun gear member 142.

The ring gear member 124, carrier member 126 and sun gear member 122 correspond with nodes A, B and C, respectively, of FIGS. 1-4. The ring gear member 134, carrier member 136 and sun gear member 132 correspond with nodes D, E and F, respectively. The first ring gear member 143 corresponds with node G, the second ring gear member 144 corresponds with node H, the sun gear member 142 corresponds with I and the planet carrier member 146 corresponds with node J.

The electrically-variable transmission 114 also includes two motor/generators 180 and 182 that may receive electrical power from or provide electrical power to an energy storage device 186 such as a battery. An electronic controller 188 is in signal communication with the battery 186 and with a power inverter 190 that is also in electrical communication with the stator portions of the motor/generators 180, 182. The controller 188 responds to a variety of input signals including vehicle speed, operator demand, the level at which the battery 186 is charged and the power being provided by the engine 12 to regulate the flow of power between the motor/generators 180, 182 and the battery 186 via the inverter 190, which converts between direct current provided or utilized by the battery 186 and alternating current provided or utilized by the stator portions of the motor/generators 180, 182.

The electrically-variable transmission 114 also includes a plurality of torque-transmitting mechanisms 150, 152, 154 and 156. Torque-transmitting mechanism 150 is selectively engagable to ground the carrier member 146 to a stationary member 184. Torque-transmitting mechanism 152 is selectively engagable to connect the sun gear member 132 and motor/generator 182 for common rotation with the first ring gear member 143. Torque-transmitting mechanism 154 is selectively engagable to ground the ring gear member 134 to the stationary member 184. Finally, torque-transmitting mechanism 156 is selectively engagable to connect the motor/generator 180 and the ring gear member 134 for common rotation.

The operation of the powertrain 110 is the same as the operation of the powertrain 10, depicted in FIGS. 1-4. That is, engagement of torque-transmitting mechanisms 150 and 154 establish a first forward electrically-variable mode, engagement of torque-transmitting mechanisms 150 and 156 establish a second forward electrically-variable mode, and engagement of torque-transmitting mechanisms 152 and 156 establish a third forward electrically-variable mode. The transmission 14 also provides three fixed ratio modes of operation. A first fixed ratio mode is provided by engaging torque-transmitting mechanisms 150, 154 and 156, preferably at the first shift point established between the first and second forward electrically-variable modes. A second fixed ratio mode is established by engaging torque-transmitting mechanisms 150, 152 and 156, preferably at the second shift point established between the second and third electrically-variable modes. A third fixed ratio mode is established by engaging torque-transmitting mechanisms 152, 154, and 156, preferably at the third shift point when the speed of motor/generator 80 is zero.

A powertrain 210, shown in FIG. 6, provides a specific embodiment of a transmission 214 representable by and operable in the same manner as the powertrain 10 shown in lever diagram form in FIGS. 1-4. Powertrain 210 includes the engine 12, the final drive mechanism 17, and an electrically-variable transmission 214 with an input member 216 connected for rotation with the engine 12 and an output member 218 connected for rotation with the final drive mechanism 17. The transmission 214 includes three planetary gear assemblies 220, 230, and 240, represented in FIGS. 1-4 as levers 20, 30 and 40, respectively.

The planetary gear assembly 220 includes a sun gear member 222, a ring gear member 224, and a carrier member 226. The carrier member 226 rotatably supports a plurality of pinion gears 227 that are disposed in meshing relationship with both the sun gear member 222 and the ring gear member 224. The ring gear member 224 has 86 teeth and the sun gear member 222 has 44 teeth, establishing an effective gear ratio of 1.954 for the planetary gear assembly 220.

The planetary gear assembly 230 includes a sun gear member 232, a ring gear member 234, and a carrier member 236 that rotatably supports a plurality of pinion gears 237 that are disposed in meshing relationship with both the sun gear member 232 and the ring gear member 234. The ring gear member 234 has 86 teeth and the sun gear member 232 has 44 teeth, establishing an effective gear ratio of 1.954 for the planetary gear assembly 230.

The planetary gear assembly 240 is a Simpson gear set. A Simpson gear set consists of two simple planetary gear assemblies with a common sun gear and internal gears of different diameter; the planet carrier of one set is fixed to the internal gear of the other set. The planetary gear assembly 240 includes a first sun gear member 241, a second sun gear member 242, a first ring gear member 243, a second ring gear member 244, a first carrier member 245, and a second carrier member 246. The first carrier member 245 rotatably supports a first set of pinion gears 247 and the second carrier member rotatably supports a second set of pinion gears 248. The first set of pinion gears 247 are disposed in meshing relationship with the first sun gear member 241 and the first ring gear member 243 and the second set of pinion gears 248 are disposed in meshing relationship with the second sun gear member 242 and the second ring gear member 244.

An interconnecting member 270 continuously connects the carrier member 226, the carrier member 236, and first ring gear 243. The interconnecting member 270 may alternatively be two separate components, one connecting the carrier members 226 and 236, and another connecting carrier member 236 with first ring gear 243.

The ring gear member 224, carrier member 226 and sun gear member 222 correspond with nodes A, B and C, respectively, of FIGS. 1-4. The ring gear member 234, carrier member 236 and sun gear member 232 correspond with nodes D, E and F, respectively. The first and second sun gear members 241 and 242 correspond with node G, the first carrier member 245 and the second ring gear member 244 correspond with node H, the first ring gear member 243 corresponds with I and the second carrier member 246 corresponds with node J.

The electrically-variable transmission 214 also includes two motor/generators 280 and 282 that may receive electrical power from or provide electrical power to an energy storage device 286 such as a battery. An electronic controller 288 is in signal communication with the battery 286 and with a power inverter 290 that is also in electrical communication with the stator portions of the motor/generators 280, 282. The controller 288 responds to a variety of input signals including vehicle speed, operator demand, the level at which the battery 286 is charged and the power being provided by the engine 12 to regulate the flow of power between the motor/generators 280, 282 and the battery 286 via the inverter 290, which converts between direct current provided or utilized by the battery 286 and alternating current provided or utilized by the stator portions of the motor/generators 280, 282.

The electrically-variable transmission 214 also includes a plurality of torque-transmitting mechanisms 250, 252, 254 and 256. Torque-transmitting mechanism 250 is selectively engagable to ground the second carrier member 246 to a stationary member 284. Torque-transmitting mechanism 252 is selectively engagable to connect the sun gear member 232 and motor/generator 282 for common rotation with the first and second sun gear members 241 and 242. Torque-transmitting mechanism 254 is selectively engagable to ground the ring gear member 234 to the stationary member 284. Finally, torque-transmitting mechanism 256 is selectively engagable to connect the motor/generator 280 and the ring gear member 234 for common rotation.

The operation of the powertrain 210 is the same as the operation of the powertrain 10, depicted in FIGS. 1-4. That is, engagement of torque-transmitting mechanisms 250 and 254 establish a first forward electrically-variable mode, engagement of torque-transmitting mechanisms 250 and 256 establish a second forward electrically-variable mode, and engagement of torque-transmitting mechanisms 252 and 256 establish a third forward electrically-variable mode. The transmission 14 also provides three fixed ratio modes of operation. A first fixed ratio mode is provided by engaging torque-transmitting transmitting mechanisms 250, 254 and 256, preferably at the first shift point established between the first and second forward electrically-variable modes. A second fixed ratio mode is established by engaging torque-transmitting mechanisms 250, 252 and 256, preferably at the second shift point established between the second and third electrically-variable modes. A third fixed ratio mode is established by engaging torque-transmitting mechanisms 252, 254, and 256, preferably at the third shift point when the speed of motor/generator 80 is zero.

A powertrain 310, shown in FIG. 7, provides a specific embodiment of a transmission 314 representable by and operable in the same manner as the powertrain 10 shown in lever diagram form in FIGS. 1-4. Powertrain 310 includes the engine 12, the final drive mechanism 17, and an electrically-variable transmission 314 with an input member 316 connected for rotation with the engine 12 and an output member 318 connected for rotation with the final drive mechanism 17. The transmission 314 includes three planetary gear assemblies 320, 330, and 340, represented in FIGS. 1-4 as levers 20, 30 and 40, respectively.

The planetary gear assembly 320 includes a sun gear member 322, a ring gear member 324, and a carrier member 326. The carrier member 326 rotatably supports a plurality of pinion gears 327 that are disposed in meshing relationship with both the sun gear member 322 and the ring gear member 324. The ring gear member 324 has 86 teeth and the sun gear member 322 has 44 teeth, establishing an effective gear ratio of 1.954 for the planetary gear assembly 320.

The planetary gear assembly 330 includes a sun gear member 332, a ring gear member 334, and a carrier member 336 that rotatably supports a plurality of pinion gears 337 that are disposed in meshing relationship with both the sun gear member 332 and the ring gear member 334. The ring gear member 334 has 86 teeth and the sun gear member 332 has 44 teeth, establishing an effective gear ratio of 1.954 for the planetary gear assembly 330.

The planetary gear assembly 340 is a stepped pinion gear set and includes a first sun gear member 341, a second sun gear member 342, a ring gear member 344, and a carrier member 346. The carrier member 346 rotatably supports a first set of pinion gears 347 as well as a second set of pinion gears 348. The first set of pinion gears 347 are disposed in meshing relationship with the first sun gear member 341 and the ring gear member 344 and the second set of pinion gears 348 are disposed in meshing relationship with the second sun gear member 342 and rotate about the same axes as the first set of pinion gears 347.

An interconnecting member 370 continuously connects the carrier member 326, the carrier member 336, and the first sun gear member 341. The interconnecting member 370 may alternatively be two separate components, one connecting the carrier members 326 and 336, and another connecting carrier member 336 with first sun gear member 341.

The ring gear member 324, carrier member 326 and sun gear member 322 correspond with nodes A, B and C, respectively, of FIGS. 1-4. The ring gear member 334, carrier member 336 and sun gear member 332 correspond with nodes D, E and F, respectively. The ring gear member 344 corresponds with node G, the second sun gear member 342 corresponds with node H, the first sun gear 341 corresponds with I and the planet carrier 346 corresponds with node J.

The electrically-variable transmission 314 also includes two motor/generators 380 and 382 that may receive electrical power from or provide electrical power to an energy storage device 386 such as a battery. An electronic controller 388 is in signal communication with the battery 386 and with a power inverter 390 that is also in electrical communication with the stator portions of the motor/generators 380, 382. The controller 388 responds to a variety of input signals including vehicle speed, operator demand, the level at which the battery 386 is charged and the power being provided by the engine 12 to regulate the flow of power between the motor/generators 380, 382 and the battery 386 via the inverter 390, which converts between direct current provided or utilized by the battery 386 and alternating current provided or utilized by the stator portions of the motor/generators 380, 382.

The electrically-variable transmission 314 also includes a plurality of torque-transmitting mechanisms 350, 352, 354 and 356. Torque-transmitting mechanism 350 is selectively engagable to ground the carrier member 346 to a stationary member 384. Torque-transmitting mechanism 352 is selectively engagable to connect the sun gear member 332 and motor/generator 382 for common rotation with the ring gear 344. Torque-transmitting mechanism 354 is selectively engagable to ground the ring gear member 334 to the stationary member 384. Finally, torque-transmitting mechanism 356 is selectively engagable to connect the motor/generator 380 and the ring gear member 334 for common rotation.

Figure 8:
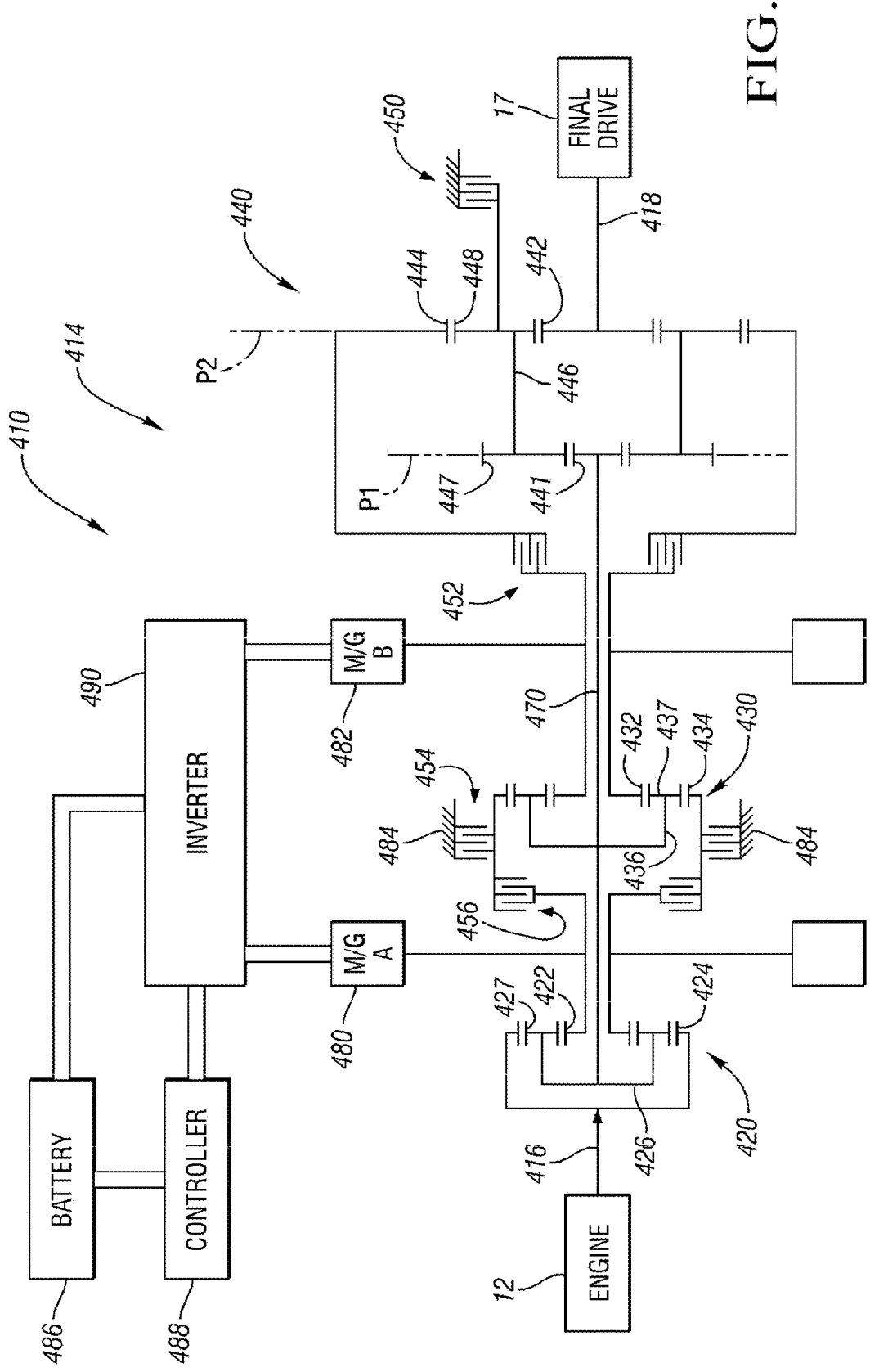
FIG. 8 is a schematic illustration of another embodiment of the transmission of FIG. 1 in stick-diagram form.

A powertrain 410, shown in FIG. 8, provides a specific embodiment of a transmission 414 representable by and operable in the same manner as the powertrain 10 shown in lever diagram form in FIGS. 1-4. Powertrain 410 includes the engine 12, the final drive mechanism 17, and an electrically-variable transmission 414 with an input member 416 connected for rotation with the engine 12 and an output member 418 connected for rotation with the final drive mechanism 17. The transmission 414 includes three planetary gear assemblies 420, 430, and 440, represented in FIGS. 1-4 as levers 20, 30 and 40, respectively.

The planetary gear assembly 420 includes a sun gear member 422, a ring gear member 424, and a carrier member 426. The carrier member 426 rotatably supports a plurality of pinion gears 427 that are disposed in meshing relationship with both the sun gear member 422 and the ring gear member 424. The ring gear member 424 has 86 teeth and the sun gear member 422 has 44 teeth, establishing an effective gear ratio of 1.954 for the planetary gear assembly 420.

The planetary gear assembly 430 includes a sun gear member 432, a ring gear member 434, and a carrier member 436 that rotatably supports a plurality of pinion gears 437 that are disposed in meshing relationship with both the sun gear member 432 and the ring gear member 434. The ring gear member 434 has 86 teeth and the sun gear member 432 has 44 teeth, establishing an effective gear ratio of 1.954 for the planetary gear assembly 430.

The planetary gear assembly 440 is another stepped pinion gear set and includes a first sun gear member 441, a second sun gear member 442, a ring gear member 444, and a carrier member 446. The carrier member 446 rotatably supports a first set of pinion gears 447 as well as a second set of pinion gears 448. The first set of pinion gears 447 are disposed in meshing relationship with the first sun gear member 441 and the second set of pinion gears 448 are disposed in meshing relationship with the second sun gear member 442 and the ring gear member 444, and rotate about the same axes as the first set of pinion gears 447.

An interconnecting member 470 continuously connects the carrier member 426, the carrier member 436, and the first sun gear member 441. The interconnecting member 470 may alternatively be two separate components, one connecting the carrier members 426 and 436, and another connecting carrier member 436 with first sun gear member 441.

The ring gear member 424, carrier member 426 and sun gear member 422 correspond with nodes A, B and C, respectively, of FIGS. 1-4. The ring gear member 434, carrier member 436 and sun gear member 432 correspond with nodes D, E and F, respectively. The ring gear member 444 corresponds with node G, the second sun gear member 442 corresponds with node H, the first sun gear 441 corresponds with I and the planet carrier 446 corresponds with node J.

The electrically-variable transmission 414 also includes two motor/generators 480 and 482 that may receive electrical power from or provide electrical power to an energy storage device 486 such as a battery. An electronic controller 488 is in signal communication with the battery 486 and with a power inverter 490 that is also in electrical communication with the stator portions of the motor/generators 480, 482. The controller 488 responds to a variety of input signals including vehicle speed, operator demand, the level at which the battery 486 is charged and the power being provided by the engine 12 to regulate the flow of power between the motor/generators 480, 482 and the battery 486 via the inverter 490, which converts between direct current provided or utilized by the battery 486 and alternating current provided or utilized by the stator portions of the motor/generators 480, 482.

The electrically-variable transmission 414 also includes a plurality of torque-transmitting mechanisms 450, 452, 454 and 456. Torque-transmitting mechanism 450 is selectively engagable to ground the carrier member 446 to a stationary member 484. Torque-transmitting mechanism 452 is selectively engagable to connect the sun gear member 432 and motor/generator 482 for common rotation with the ring gear 444. Torque-transmitting mechanism 454 is selectively engagable to ground the ring gear member 434 to the stationary member 484. Finally, torque-transmitting mechanism 456 is selectively engagable to connect the motor/generator 480 and the ring gear member 434 for common rotation.

The operation of the powertrain 410 is the same as the operation of the powertrain 10, depicted in FIGS. 1-4. That is, engagement of torque-transmitting mechanisms 450 and 454 establish a first forward electrically-variable mode, engagement of torque-transmitting mechanisms 450 and 456 establish a second forward electrically-variable mode, and engagement of torque-transmitting mechanisms 452 and 456 establish a third forward electrically-variable mode. The transmission 14 also provides three fixed ratio modes of operation. A first fixed ratio mode is provided by engaging torque-transmitting mechanisms 450, 454 and 456, preferably at the first shift point established between the first and second forward electrically-variable modes. A second fixed ratio mode is established by engaging torque-transmitting mechanisms 450, 452 and 456, preferably at the second shift point established between the second and third electrically-variable modes. A third fixed ratio mode is established by engaging torque-transmitting mechanisms 452, 454 and 456, preferably at the third shift point when the speed of motor/generator 480 is zero.

Figure 9:
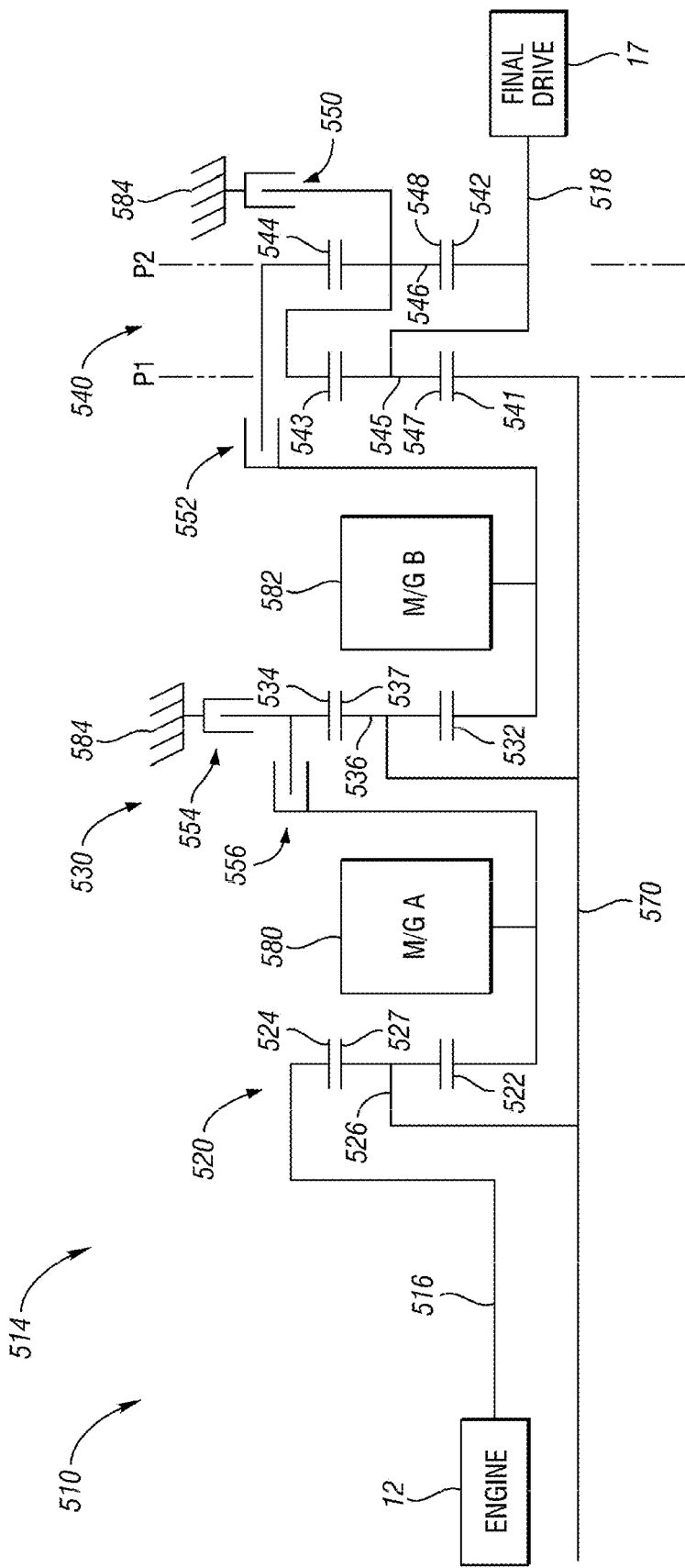
FIG. 9 is a schematic illustration of another embodiment of the transmission of FIG. 1 in stick-diagram form.

A powertrain 510, shown in FIG. 9, provides a specific embodiment of a transmission 514 representable by and operable in the same manner as the powertrain 10 shown in lever diagram form in FIGS. 1-4. Powertrain 510 includes the engine 12, the final drive mechanism 17, and an electrically-variable transmission 514 with an input member 516 connected for rotation with the engine 12 and an output member 518 connected for rotation with the final drive mechanism 17. The transmission 514 includes three planetary gear assemblies 520, 530, and 540, represented in FIGS. 1-4 as levers 20, 30 and 40, respectively.

The planetary gear assembly 520 includes a sun gear member 522, a ring gear member 524, and a carrier member 526. The carrier member 526 rotatably supports a plurality of pinion gears 527 that are disposed in meshing relationship with both the sun gear member 522 and the ring gear member 524. The ring gear member 524 has 86 teeth and the sun gear member 522 has 44 teeth, establishing an effective gear ratio of 1.954 for the planetary gear assembly 520.

The planetary gear assembly 530 includes a sun gear member 532, a ring gear member 534, and a carrier member 536 that rotatably supports a plurality of pinion gears 537 that are disposed in meshing relationship with both the sun gear member 532 and the ring gear member 534. The ring gear member 534 has 86 teeth and the sun gear member 532 has 44 teeth, establishing an effective gear ratio of 1.954 for the planetary gear assembly 530.

The planetary gear assembly 540 includes a first sun gear member 541, a second sun gear member 542, a first ring gear member 543, a second ring gear member 544, a first carrier member 545 and a second carrier member 546. The first carrier member 545 rotatably supports a first set of pinion gears 547 and the second carrier member 546 rotatably supports a second set of pinion gears 548. The first set of pinion gears 547 are disposed in meshing relationship with the first sun gear member 541 and the first ring gear member 543 and the second set of pinion gears 548 are disposed in meshing relationship with the second sun gear member 542 and the second ring gear member 544.

An interconnecting member 570 continuously connects the carrier member 526, the carrier member 536, and the first sun gear member 541. The interconnecting member 570 may alternatively be two separate components, one connecting the carrier members 526 and 536, and another connecting carrier member 536 with first sun gear member 541.

The ring gear member 524, carrier member 526 and sun gear member 522 correspond with nodes A, B and C, respectively, of FIGS. 1-4. The ring gear member 534, carrier member 536 and sun gear member 532 correspond with nodes D, E and F, respectively. The second ring gear member 544 corresponds with node G. The first carrier member 545 and the second sun member 542 correspond with node H. The first sun gear 541 corresponds with I and the first ring gear 543 and the second carrier member 546 correspond with node J.

The electrically-variable transmission 514 also includes a plurality of torque-transmitting mechanisms 550, 552, 554 and 556. Torque-transmitting mechanism 550 is selectively engagable to ground the first ring gear member 543 and the second carrier member 546 to a stationary member 584. Torque-transmitting mechanism 552 is selectively engagable to connect the sun gear member 532 and motor/generator 582 for common rotation with the second ring gear member 544. Torque-transmitting mechanism 554 is selectively engagable to ground the ring gear member 534 to the stationary member 584. Finally, torque-transmitting mechanism 556 is selectively engagable to connect the motor/generator 580 and the ring gear member 534 for common rotation.

Figure 10:
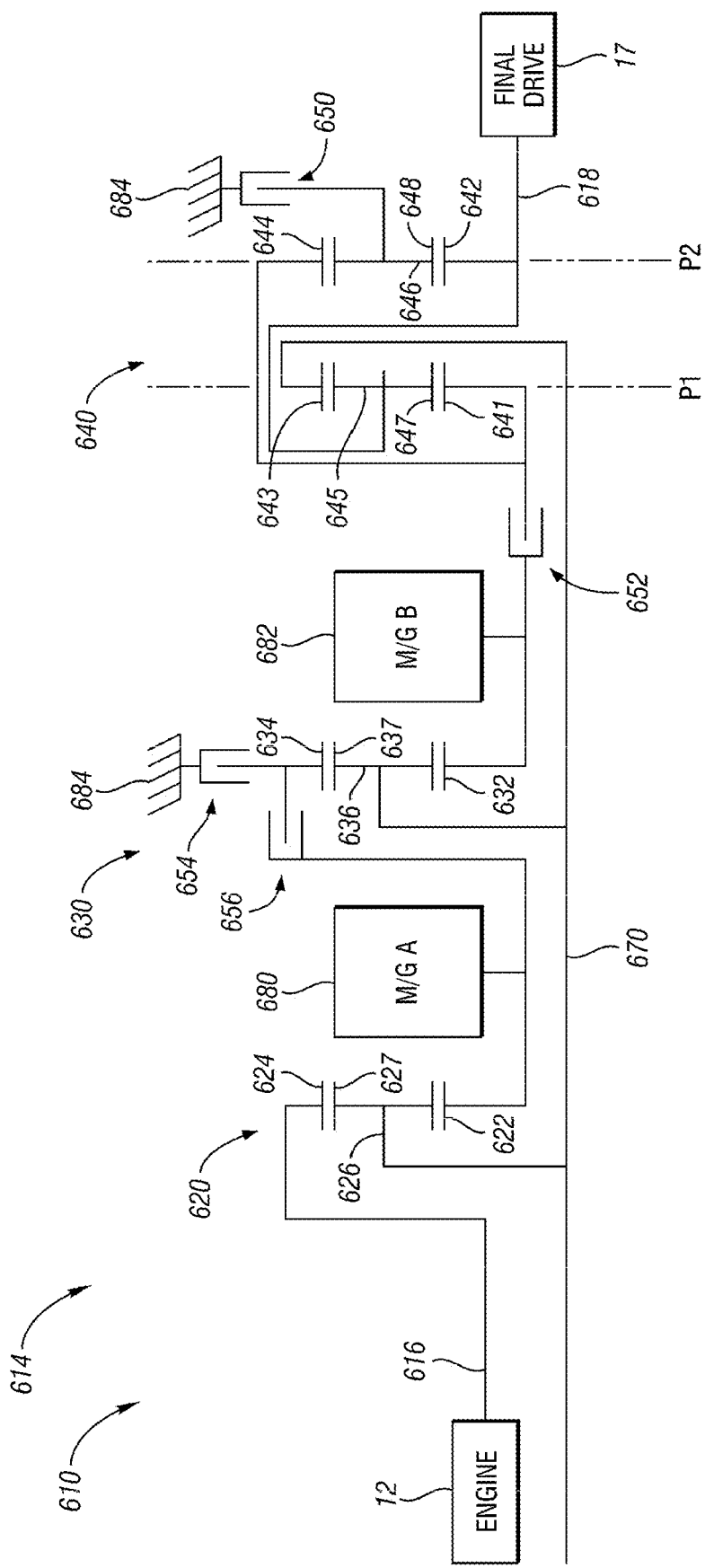
FIG. 10 is a schematic illustration of another embodiment of the transmission of FIG. 1 in stick-diagram form.

A powertrain 610, shown in FIG. 10, provides a specific embodiment of a transmission 614 representable by and operable in the same manner as the powertrain 10 shown in lever diagram form in FIGS. 1-4. Powertrain 610 includes the engine 12, the final drive mechanism 17, and an electrically-variable transmission 614 with an input member 616 connected for rotation with the engine 12 and an output member 618 connected for rotation with the final drive mechanism 17. The transmission 614 includes three planetary gear assemblies 620, 630, and 640, represented in FIGS. 1-4 as levers 20, 30 and 40, respectively.

The planetary gear assembly 620 includes a sun gear member 622, a ring gear member 624, and a carrier member 626. The carrier member 626 rotatably supports a plurality of pinion gears 627 that are disposed in meshing relationship with both the sun gear member 622 and the ring gear member 624. The ring gear member 624 has 86 teeth and the sun gear member 622 has 44 teeth, establishing an effective gear ratio of 1.954 for the planetary gear assembly 620.

The planetary gear assembly 630 includes a sun gear member 632, a ring gear member 634, and a carrier member 636 that rotatably supports a plurality of pinion gears 637 that are disposed in meshing relationship with both the sun gear member 632 and the ring gear member 634. The ring gear member 634 has 86 teeth and the sun gear member 632 has 44 teeth, establishing an effective gear ratio of 1.954 for the planetary gear assembly 630.

The planetary gear assembly 640 includes a first sun gear member 641, a second sun gear member 642, a first ring gear member 643, a second ring gear member 644, a first carrier member 645 and a second carrier member 646. The first carrier member 645 rotatably supports a first set of pinion gears 647 and the second carrier member 646 rotatably supports a second set of pinion gears 648. The first set of pinion gears 647 are disposed in meshing relationship with the first sun gear member 641 and the first ring gear member 643 and the second set of pinion gears 648 are disposed in meshing relationship with the second sun gear member 642 and the second ring gear member 644.

An interconnecting member 670 continuously connects the carrier member 626, the carrier member 636, and the first ring gear member 643. The interconnecting member 670 may alternatively be two separate components, one connecting the carrier members 626 and 636, and another connecting carrier member 636 with first ring gear member 643.

The ring gear member 624, carrier member 626 and sun gear member 622 correspond with nodes A, B and C, respectively, of FIGS. 1-4. The ring gear member 634, carrier member 636 and sun gear member 632 correspond with nodes D, E and F, respectively. The first sun gear 641 and the second ring gear member 644 correspond with node G. The first carrier member 645 and the second sun member 642 correspond with node H. The first ring gear 643 corresponds with I. The second carrier member 646 correspond with node J.

The electrically-variable transmission 614 also includes a plurality of torque-transmitting mechanisms 650, 652, 654 and 656. Torque-transmitting mechanism 650 is selectively engagable to ground the second carrier member 646 to a stationary member 684. Torque-transmitting mechanism 652 is selectively engagable to connect the sun gear member 632 and motor/generator 682 for common rotation with the first sun gear member 641 and the second ring gear member 644. Torque-transmitting mechanism 654 is selectively engagable to ground the ring gear member 634 to the stationary member 684. Finally, torque-transmitting mechanism 656 is selectively engagable to connect the motor/generator 680 and the ring gear member 634 for common rotation.

Figure 11:
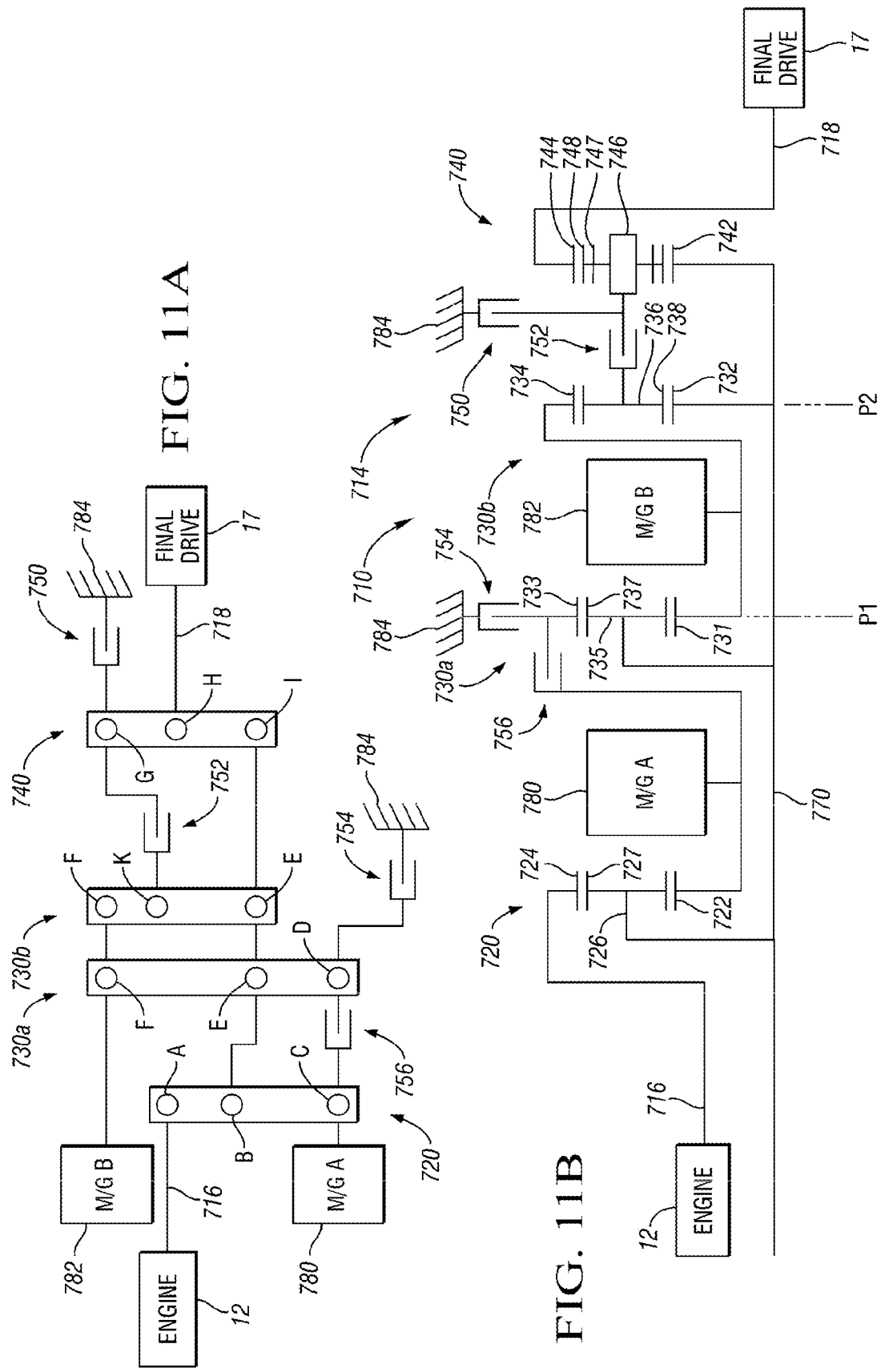
FIG. 11A is a schematic illustration of an embodiment of an electrically-variable transmission depicted in lever diagram form.
FIG. 11B is a schematic illustration of an embodiment of the transmission of FIG. 11A in stick-diagram form.

A powertrain 710, shown in FIGS. 11a and 11b, provides a specific embodiment of a transmission 714. Powertrain 710 includes the engine 12, the final drive mechanism 17, and an electrically-variable transmission 714 with an input member 716 connected for rotation with the engine 12 and an output member 718 connected for rotation with the final drive mechanism 17. The transmission 714 includes three planetary gear assemblies 720, 730, and 740, represented in FIGS. 11a as levers 720, 730a, 730b and 740, respectively. Planetary gear assembly 730 is a planetary gear assembly, having gears on multiple gear planes, as described above. Each gear plane is represented by a lever, 730a and 730b. Levers 730a and 730b can also be represented as a single four node lever as is known in the art. Planetary gear assembly 740 is a planetary gear assembly, which can be represented by a three node lever.

The planetary gear assembly 720 includes a sun gear member 722, a ring gear member 724, and a carrier member 726. The carrier member 726 rotatably supports a plurality of pinion gears 727 that are disposed in meshing relationship with both the sun gear member 722 and the ring gear member 724. The ring gear member 724 has 86 teeth and the sun gear member 722 has 44 teeth, establishing an effective gear ratio of 1.954 for the planetary gear assembly 720.

The planetary gear assembly 730 includes a first sun gear member 731 and a second sun gear member 732. A first ring gear member 733 and a second ring gear member 734. A first carrier member 735 and a second carrier member 736. The first carrier member 735 rotatably supports a plurality of first pinion gears 737 that are disposed in meshing relationship with both the first sun gear member 731 and the first ring gear member 733. The second carrier member 736 rotatably supports a second plurality of pinion gears 738 that are disposed in meshing relationship with both the second sun gear member 732 and the second ring gear member 734.

The planetary gear assembly 740 includes a sun gear member 742, a ring gear member 744, a carrier member 746. The carrier member 746 rotatably supports a first set of pinion gears 747 and a second set of pinion gears 748. The first set of pinion gears 747 are disposed in meshing relationship with the first sun gear member 731 and the second set of pinion gears 748. The second set of pinion gear 748 are disposed in meshing relationship with the first set of pinion gears 747 and the ring gear member 744.

An interconnecting member 770 continuously connects the carrier member 726, the first carrier member 735, the second sun gear member 732 and the sun gear member 742. The interconnecting member 770 may alternatively be two separate components, one connecting the carrier members 726 and first carrier 735, and another connecting the second sun gear member 732 with sun gear member 742.

The ring gear member 724, carrier member 726 and sun gear member 722 correspond with nodes A, B and C, respectively, of FIG. 11a. The first ring gear member 733 corresponds with node D. The first carrier member 735 and the second ring gear member 734 correspond with node E. The first sun gear member 731 and the second ring gear member 734 correspond with node F. The second carrier member 736 corresponds with node K. The carrier member 746 corresponds with node G. The ring gear member 744 corresponds with node H. The sun gear member 742 corresponds with I.

The electrically-variable transmission 714 also includes a plurality of torque-transmitting mechanisms 750, 752, 754 and 756. Torque-transmitting mechanism 750 is selectively engagable to ground the carrier member 746 to a stationary member 684. Torque-transmitting mechanism 752 is selectively engagable to connect the second ring gear member 734 and motor/generator 782 for common rotation with the carrier member 746. Torque-transmitting mechanism 754 is selectively engagable to ground the first ring gear member 733 to the stationary member 784. Finally, torque-transmitting mechanism 756 is selectively engagable to connect the motor/generator 780 and the first ring gear member 733 for common rotation.

Figure 12:
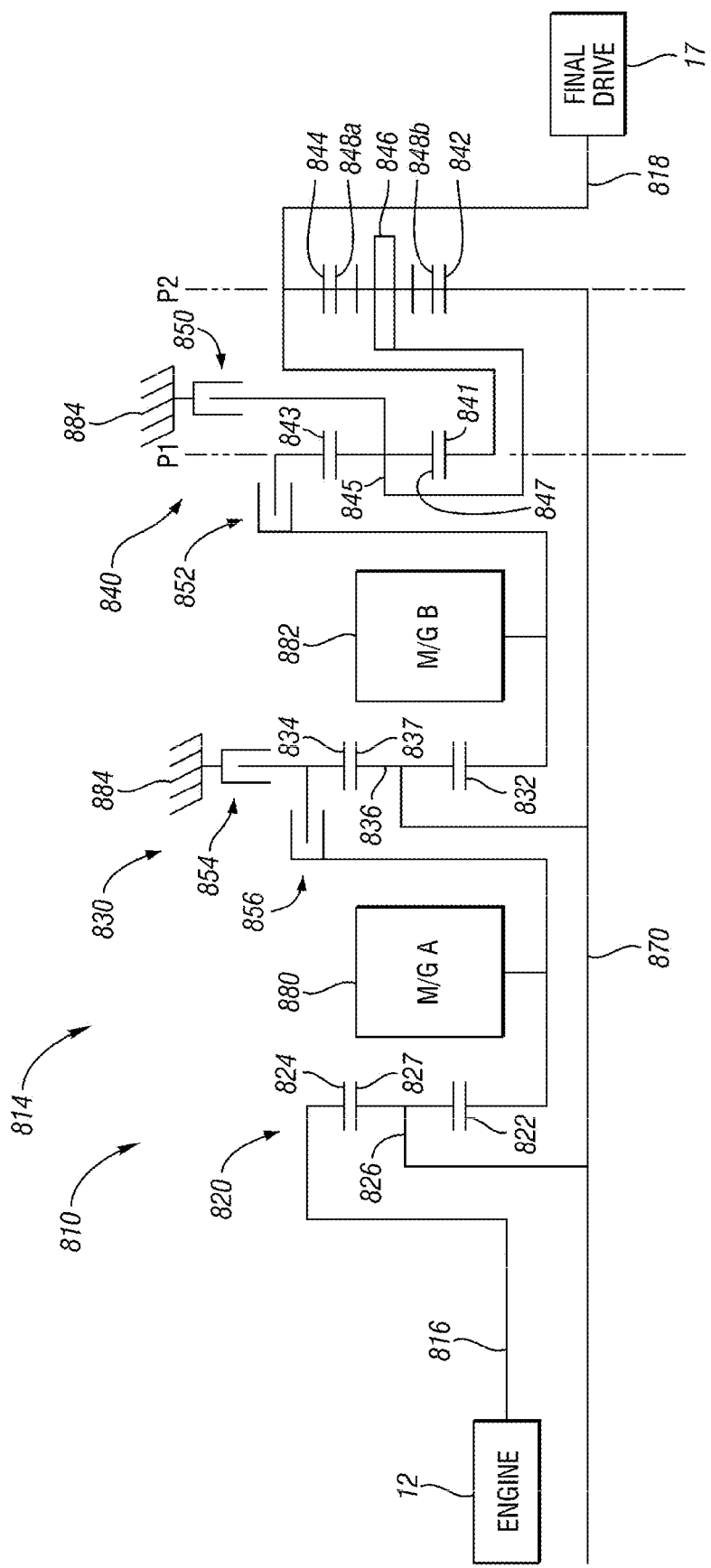
FIG. 12 is a schematic illustration of another embodiment of the transmission of FIG. 1 in stick-diagram form.

A powertrain 810, shown in FIG. 12, provides a specific embodiment of a transmission 814 representable by and operable in the same manner as the powertrain 10 shown in lever diagram form in FIGS. 1-4. Powertrain 810 includes the engine 12, the final drive mechanism 17, and an electrically-variable transmission 814 with an input member 816 connected for rotation with the engine 12 and an output member 818 connected for rotation with the final drive mechanism 17. The transmission 814 includes three planetary gear assemblies 820, 830, and 840, represented in FIGS. 1-4 as levers 20, 30 and 40, respectively.

The planetary gear assembly 820 includes a sun gear member 822, a ring gear member 824, and a carrier member 826. The carrier member 826 rotatably supports a plurality of pinion gears 827 that are disposed in meshing relationship with both the sun gear member 822 and the ring gear member 824. The ring gear member 824 has 86 teeth and the sun gear member 822 has 44 teeth, establishing an effective gear ratio of 1.954 for the planetary gear assembly 820.

The planetary gear assembly 830 includes a sun gear member 832, a ring gear member 834, and a carrier member 836 that rotatably supports a plurality of pinion gears 837 that are disposed in meshing relationship with both the sun gear member 832 and the ring gear member 834. The ring gear member 834 has 86 teeth and the sun gear member 832 has 44 teeth, establishing an effective gear ratio of 1.954 for the planetary gear assembly 830.

The planetary gear assembly 840 includes a first sun gear member 841, a second sun gear member 842, a first ring gear member 843, a second ring gear member 844, a first carrier member 845 and a second carrier member 846. The first carrier member 845 rotatably supports a first set of pinion gears 847 and the second carrier member 846 rotatably supports a second set of pinion gears 848a and a third set on pinion gears 848b. The first set of pinion gears 847 are disposed in meshing relationship with the first sun gear member 841 and the first ring gear member 843. The second set of pinion gears 848a are disposed in meshing relationship with the second sun gear member 842 and the third set of pinion gear 848b and the third set of pinion gears are disposed in meshing relationship with the second set of pinion gears 848a and the second ring gear member 844.

An interconnecting member 870 continuously connects the carrier member 826, the carrier member 836, and the second sun gear member 842. The interconnecting member 870 may alternatively be two separate components, one connecting the carrier members 826 and 836, and another connecting carrier member 836 with second sun gear member 842.

The ring gear member 824, carrier member 826 and sun gear member 822 correspond with nodes A, B and C, respectively, of FIGS. 1-4. The ring gear member 834, carrier member 836 and sun gear member 832 correspond with nodes D, E and F, respectively. The first ring gear member 843 corresponds with node G. The first sun member 841 and the second ring gear member 844 correspond with node H. The second sun gear member 842 corresponds with I. The first carrier member 845 and the second carrier member 846 correspond with node J.

The electrically-variable transmission 814 also includes a plurality of torque-transmitting mechanisms 850, 852, 854 and 856. Torque-transmitting mechanism 850 is selectively engagable to ground the first carrier member 845 and the second carrier member 846 to a stationary member 884. Torque-transmitting mechanism 852 is selectively engagable to connect the first ring gear member 843 and motor/generator 882 for common rotation with the first sun gear member 841 and the second ring gear member 844. Torque-transmitting mechanism 854 is selectively engagable to ground the ring gear member 834 to the stationary member 884. Finally, torque-transmitting mechanism 856 is selectively engagable to connect the motor/generator 880 and the ring gear member 834 for common rotation.

Figure 13:
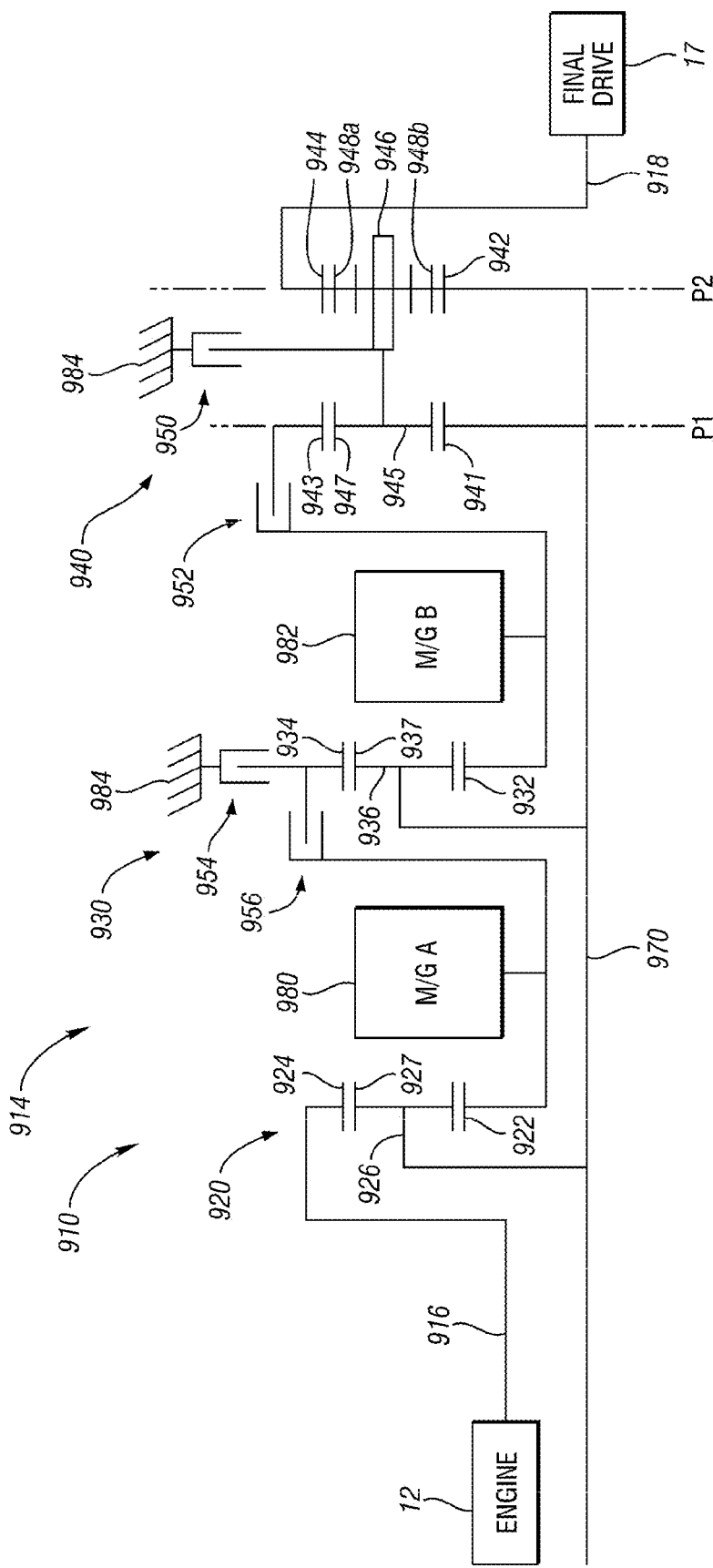
FIG. 13 is a schematic illustration of another embodiment of the transmission of FIG. 1 in stick-diagram form.

A powertrain 910, shown in FIG. 13, provides a specific embodiment of a transmission 914 representable by and operable in the same manner as the powertrain 10 shown in lever diagram form in FIGS. 1-4. Powertrain 910 includes the engine 12, the final drive mechanism 17, and an electrically-variable transmission 914 with an input member 916 connected for rotation with the engine 12 and an output member 918 connected for rotation with the final drive mechanism 17. The transmission 914 includes three planetary gear assemblies 920, 930, and 940, represented in FIGS. 1-4 as levers 20, 30 and 40, respectively.

The planetary gear assembly 920 includes a sun gear member 922, a ring gear member 924, and a carrier member 926. The carrier member 926 rotatably supports a plurality of pinion gears 927 that are disposed in meshing relationship with both the sun gear member 922 and the ring gear member 924. The ring gear member 924 has 86 teeth and the sun gear member 922 has 44 teeth, establishing an effective gear ratio of 1.954 for the planetary gear assembly 920.

The planetary gear assembly 930 includes a sun gear member 932, a ring gear member 934, and a carrier member 936 that rotatably supports a plurality of pinion gears 937 that are disposed in meshing relationship with both the sun gear member 932 and the ring gear member 934. The ring gear member 934 has 86 teeth and the sun gear member 932 has 44 teeth, establishing an effective gear ratio of 1.954 for the planetary gear assembly 930.

The planetary gear assembly 940 includes a first sun gear member 941, a second sun gear member 942, a first ring gear member 943, a second ring gear member 944, a first carrier member 945 and a second carrier member 946. The first carrier member 945 rotatably supports a first set of pinion gears 947 and the second carrier member 946 rotatably supports a second set of pinion gears 948a and a third set of pinion gears 948b. The first set of pinion gears 947 are disposed in meshing relationship with the first sun gear member 941 and the first ring gear member 943. The second set of pinion gears 948a are disposed in meshing relationship with the second sun gear member 942 and the third set of pinion gear 948b and the third set of pinion gears are disposed in meshing relationship with the second set of pinion gears 948a and the second ring gear member 944.

An interconnecting member 970 continuously connects the carrier member 926, the carrier member 936, and the second sun gear member 942. The interconnecting member 970 may alternatively be two separate components, one connecting the carrier members 926 and 936, and another connecting carrier member 936 with second sun gear member 942.

The ring gear member 924, carrier member 926 and sun gear member 922 correspond with nodes A, B and C, respectively, of FIGS. 1-4. The ring gear member 934, carrier member 936 and sun gear member 932 correspond with nodes D, E and F, respectively. The first ring gear member 943 corresponds with node G. The second ring gear member 944 corresponds with node H. The first sun gear member 941 and the second sun gear member 942 correspond with I. The first carrier member 945 and the second carrier member 946 correspond with node J.

The electrically-variable transmission 914 also includes a plurality of torque-transmitting mechanisms 950, 952, 954 and 956. Torque-transmitting mechanism 950 is selectively engagable to ground the first carrier member 945 and the second carrier member 946 to a stationary member 984. Torque-transmitting mechanism 952 is selectively engagable to connect the first ring gear member 943 and motor/generator 982 for common rotation with the first sun gear member 941 and the second ring gear member 944. Torque-transmitting mechanism 954 is selectively engagable to ground the ring gear member 934 to the stationary member 984. Finally, torque-transmitting mechanism 956 is selectively engagable to connect the motor/generator 980 and the ring gear member 934 for common rotation.

FIGS. 14A-F are several graphs comparing the transmission 114 of FIG. 5. The graph of FIG. 14A is the inverse transmission ratio versus power relative to an engine. The transmission is one using three planetary gear assemblies representable by three-node levers, as would be defined by FIG. 1 if nodes G and J were coincident. The resulting graph shows the fraction of engine power transmitted by the motor/generator set versus inverse transmission ratio. Likewise, the graph of FIG. 14B is the inverse transmission ratio versus power relative to the engine 12. However, the transmission 114 is one using two planetary gear assemblies representable by three-node levers and one planetary gear assembly representable by a four-node lever. The resulting graph shows the fraction of engine 12 power transmitted by the motor/generator set 180 (M/G A) and 182 (M/G B) in transmission 114 versus inverse transmission ratio. As can be seen the peak power of motor/generators 180 (M/G A) and 182 (M/G B) in transmission 114, shown in FIG. 14B is less than the peak power of the transmission represented in FIG. 14A The graph of FIG. 14C is the inverse transmission ratio versus speed relative to an engine. The transmission is one using three planetary gear assemblies representable by three-node levers. The resulting graph shows the speed of pinion gears as a ratio of the speed of the engine. In FIG. 14C PG1 refers to the pinion gears of the first planetary gear assembly, PG2 refers to the pinion gears of the second planetary gear assembly and PG3 refers to the pinion gears of the third planetary gear assembly. The graph of FIG. 14D is the inverse transmission ratio versus speed relative to the engine 12. The transmission 114 is one using uses two planetary gear assemblies representable by three-node levers and one planetary gear assembly representable by a four-node lever. In FIG. 14D PG1 refers to the pinion gears 127 of the first planetary gear assembly 120, PG2 refers to the pinion gears 137 of the second planetary gear assembly 130, PG32 refers to the second set of pinion gears 148 for the third planetary gear assembly 140 and PG31 refers to the first set of pinion gears 147 for the third planetary gear assembly 140. The resulting graph shows the speed of pinion gears PG1 (127), PG2 (137), PG31 (147) and PG32 (148) as a ratio of the speed of the engine 12. As can be seen by comparing the graphs the speed of the pinion gears PG1 (127), PG2 (137), PG31 (147) and PG32 (148) of FIG. 14D have a lower speed relative to the engine than those of FIG. 14C. The reduced speed leads to less wear and a longer life for the pinion gears PG1 (127), PG2 (137), PG31 (147) and PG32 (148).

The graph of FIG. 14E is the inverse transmission ratio versus speed relative to an engine. The transmission is one using three planetary gear assemblies representable by three-node levers. The resulting graph shows the speed of the motor/generators in the transmission as a ratio of the speed of the engine. The graph of FIG. 14F is the inverse transmission ratio versus speed relative to the engine 12. The transmission 114 is one using uses two planetary gear assemblies representable by three-node levers and one planetary gear assembly representable by a four-node lever. The resulting graph shows the power of motor/generators 180 (M/G A) and 182 (M/G B) in transmission 114 as a ratio of the power of the engine 12. As can be seen the speed of motor/generators 180 (M/G A) and 182 (M/G B) in transmission 114, shown in FIG. 14F is less than the speed of the motor/generators in the transmission represented in FIG. 14E. The reduced speed leads to less wear and a longer life for the motor/generators 180 (M/G A) and 182 (M/G B).

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission comprising:
   an input member and an output member;
   a stationary member;
   first and second motor/generators;
   a first and a second planetary gear assembly, each having a first, a second and a third member;
   a third planetary gear assembly comprising a planetary gear assembly having at least two gear planes of rotation and having at least a first, a second, a third member and a fourth member each located on at least one of the gear planes;
   wherein the input member, the output member and the motor/generators are each connected for common rotation with a respective different one of the members;
   a plurality of torque-transmitting mechanisms selectively engagable to connect different ones of the members for common rotation with one another or with a stationary member;
   an interconnecting member connecting the first member of the first planetary gear assembly, the first member of the second planetary gear assembly, and the first member of the third planetary gear assembly for rotation at the same speed;
   wherein the second motor/generator is selectively connected for common rotation with the third member of the third planetary gear assembly by engagement of one of said plurality of torque-transmitting mechanisms;
   wherein the fourth member of the third planetary gear assembly is selectively connected to the stationary member by engagement of another one of said plurality of torque-transmitting mechanisms;
   wherein engagement of different combinations of the torque-transmitting mechanisms establishes three forward electrically-variable modes of operation; and
   wherein said one of said plurality of torque-transmitting mechanisms is engaged and said another of said plurality of torque-transmitting mechanisms is disengaged when the speed of the second motor/generator is substantially equal to the speed of the third member of the third planetary gear assembly to shift from one of said electrically variable modes of operation to another of said electrically-variable modes of operation.

2. The electrically-variable transmission of claim 1, wherein the third planetary gear assembly is a stepped pinion gear set.

3. The electrically-variable transmission of claim 2, wherein the first, second, third and fourth members of the third planetary gear assembly are a first sun gear member, a second sun gear member, a carrier member and a ring gear member.

4. The electrically-variable transmission of claim 1, wherein a shift point is located between each of the three forward electrically-variable modes of operation and a shaft of each of the motor/generators is rotating at one shift point.

5. The electrically-variable transmission of claim 1, wherein each of the first and second planetary gear assemblies is representable by a three-node lever having a first, a second and a third node representing the respective first, second and third members; and wherein the third planetary gear assembly is a representable by a four-node lever.

6. An electrically-variable transmission comprising:
an input member and an output member;
a first and a second motor/generator;
a first, a second and a third planetary gear assembly;
an interconnecting member connecting a first member of the first planetary gear assembly, a first member of the second planetary gear assembly and a first member of the third planetary gear assembly for common rotation;
wherein the input member is connected for common rotation with a second member of the first planetary gear assembly, and the output member is connected for common rotation with a second member of the third planetary gear assembly;
wherein the first motor/generator is continuously connected with a third member of the first planetary gear assembly;
a first torque-transmitting mechanism selectively engagable to connect the first motor/generator with a second member of the second planetary gear assembly;
wherein the second motor/generator is continuously connected with the third member of the second planetary gear assembly;
a second torque-transmitting mechanism selectively engagable to connect the second motor/generator with a third member of the third planetary gear assembly;
a third torque-transmitting mechanism selectively engagable to connect the second member of the second planetary gear assembly with the stationary member;
a fourth torque-transmitting mechanism selectively engagable to connect a fourth member of the third planetary gear assembly with the stationary member; and wherein engagement of different combinations of the torque-transmitting mechanisms establishes three forward electrically-variable modes of operation.

7. The electrically-variable transmission of claim 6, wherein the third planetary gear assembly is a stepped pinion gear set.

8. The electrically-variable transmission of claim 7, wherein the first, second third and fourth members of the third planetary gear assembly are a first sun gear member a second sun gear member, a carrier member and a ring gear member.

9. The electrically-variable transmission of claim 6, wherein a shift point is located between each of the three forward electrically-variable modes of operation and a shaft of each of the motor/generators are rotating at one shift point.

10. A transmission comprising:
three planetary gear assemblies and two motor/generators to enable three forward electrically-variable modes of operation by engagement of different combinations of a plurality torque-transmitting mechanisms;
one of the three planetary gear assemblies being a planetary gear assembly such that two of the planetary gear represented by a three-node lever and one of the planetary gear assemblies represented by a four-node lever;
a first member of a first planetary gear assembly, a first member of a second planetary gear assembly and a first member of a third planetary gear assembly connected for common rotation with an interconnecting member;
an input member connected for common rotation with a second member of the first planetary gear assembly;
an output member connected for common rotation with a second member of the third planetary gear assembly;
a first motor/generator connected for common rotation with a third member of the first planetary gear assembly, and selectively for common rotation with a second member of the second planetary gear assembly;
a second motor/generator connected for common rotation with a third member of the second planetary gear assembly, and selectively connected for common rotation with a third member of the third planetary gear assembly;
a fourth member of the third planetary gear assembly selectively connected with a stationary member; and
a second member of the second planetary gear assembly selectively coupled with a stationary member.

* * * * *